United States Patent
Stockhammer et al.

(10) Patent No.: US 12,238,353 B2
(45) Date of Patent: Feb. 25, 2025

(54) SERVICE DESCRIPTION FOR STREAMING MEDIA DATA

(71) Applicant: QUALCOMM Incorporated, San Diego, CA (US)

(72) Inventors: Thomas Stockhammer, Bergen (DE); Nikolai Konrad Leung, San Francisco, CA (US)

(73) Assignee: QUALCOMM INCORPORATED, San Diego, CA (US)

(*) Notice: Subject to any disclaimer, the term of this patent is extended or adjusted under 35 U.S.C. 154(b) by 0 days.

(21) Appl. No.: 16/591,073

(22) Filed: Oct. 2, 2019

(65) Prior Publication Data
US 2020/0112753 A1    Apr. 9, 2020

Related U.S. Application Data

(60) Provisional application No. 62/740,765, filed on Oct. 3, 2018.

(51) Int. Cl.
*H04N 21/438* (2011.01)
*H04N 21/239* (2011.01)
(Continued)

(52) U.S. Cl.
CPC ..... *H04N 21/2402* (2013.01); *H04N 21/2393* (2013.01); *H04N 21/242* (2013.01);
(Continued)

(58) Field of Classification Search
None
See application file for complete search history.

(56) References Cited

U.S. PATENT DOCUMENTS

| 5,822,537 | A * | 10/1998 | Katseff | H04N 21/4341 |
| | | | | 370/231 |
| 7,346,005 | B1 * | 3/2008 | Dowdal | H04L 43/106 |
| | | | | 370/252 |

(Continued)

FOREIGN PATENT DOCUMENTS

| CN | 102356605 A | 2/2012 |
| CN | 102356622 A | 2/2012 |

(Continued)

OTHER PUBLICATIONS

Fielding R., et al., "Hypertext Transfer Protocol—HTTP/1.1", Network Working Group, Request for Comments, RFC 2616, Jun. 1999, 114 Pages.

(Continued)

*Primary Examiner* — Younes Naji
(74) *Attorney, Agent, or Firm* — Shumaker & Sieffert, P.A.

(57) ABSTRACT

A device for receiving media data includes a memory configured to store media data of a media presentation and one or more processors implemented in circuitry and configured to retrieve a service description including data including one or more playback preferences for the media presentation, the playback preferences including a desired end-to-end latency; retrieve the media data of the media presentation via a network streaming protocol; and present the retrieved media data according to the one or more playback preferences and to achieve the desired end-to-end latency. For example, the playback preferences may specify acceleration or deceleration of playback rates in order to achieve the desired end-to-end latency. Thus, the device may accelerate playback if a buffer is filling too quickly, or decelerate playback if the buffer is emptying too quickly, to (Continued)

prevent buffer overflow or underflow and thereby avoid playback interruptions without changing the latency.

34 Claims, 9 Drawing Sheets

(51) Int. Cl.
*H04N 21/24* (2011.01)
*H04N 21/242* (2011.01)
*H04N 21/262* (2011.01)
*H04N 21/43* (2011.01)

(52) U.S. Cl.
CPC . *H04N 21/26216* (2013.01); *H04N 21/43076* (2020.08); *H04N 21/4384* (2013.01)

(56) References Cited

U.S. PATENT DOCUMENTS

| | | | |
|---|---|---|---|
| 9,426,196 | B2 | 8/2016 | Stockhammer et al. |
| 9,438,853 | B2* | 9/2016 | Van der Auwera .... H04N 7/148 |
| 9,590,814 | B2 | 3/2017 | Pazos et al. |
| 9,769,415 | B1 | 9/2017 | Buchheit et al. |
| 10,193,994 | B2 | 1/2019 | Lotfallah et al. |
| 10,432,690 | B1 | 10/2019 | Li et al. |
| 10,454,985 | B2 | 10/2019 | Stockhammer et al. |
| 2002/0052967 | A1* | 5/2002 | Goldhor ................. G10L 21/04 704/E21.017 |
| 2007/0204056 | A1* | 8/2007 | Deshpande ...... H04N 21/44004 709/231 |
| 2008/0134258 | A1 | 6/2008 | Goose et al. |
| 2008/0205856 | A1 | 8/2008 | Kim et al. |
| 2011/0116772 | A1* | 5/2011 | Kwon ................... H04L 65/612 386/343 |
| 2012/0233345 | A1 | 9/2012 | Hannuksela |
| 2013/0091297 | A1 | 4/2013 | Minder et al. |
| 2013/0279879 | A1* | 10/2013 | Watanabe ................ H04N 9/87 386/239 |
| 2013/0308794 | A1* | 11/2013 | Jochim .............. G01C 21/3629 381/107 |
| 2014/0222962 | A1 | 8/2014 | Mao et al. |
| 2014/0323036 | A1* | 10/2014 | Daley ..................... H04H 20/38 455/3.06 |
| 2015/0269629 | A1 | 9/2015 | Lo et al. |
| 2015/0281289 | A1* | 10/2015 | Lotfallah ............ H04L 65/1104 709/219 |
| 2015/0334153 | A1* | 11/2015 | Koster ................... H04L 65/65 709/219 |
| 2016/0173919 | A1* | 6/2016 | Iguchi .................. H04N 21/242 725/116 |
| 2016/0198012 | A1 | 7/2016 | Fablet et al. |
| 2016/0277466 | A1* | 9/2016 | Lohmar ............... H04L 65/612 |
| 2017/0013293 | A1* | 1/2017 | White .................. H04N 21/845 |
| 2017/0188062 | A1* | 6/2017 | Oh .......................... H04L 9/40 |
| 2019/0014358 | A1 | 1/2019 | Takabayashi et al. |
| 2019/0215361 | A1* | 7/2019 | Lohmar ................. H04L 67/10 |
| 2020/0021867 | A1 | 1/2020 | Park et al. |
| 2020/0084459 | A1 | 3/2020 | Ronca et al. |
| 2020/0092342 | A1 | 3/2020 | Schmelcher et al. |
| 2020/0112761 | A1 | 4/2020 | Stockhammer et al. |
| 2020/0228586 | A1 | 7/2020 | Skupin et al. |
| 2020/0411021 | A1 | 12/2020 | Hamada et al. |

FOREIGN PATENT DOCUMENTS

| | | |
|---|---|---|
| CN | 104079622 A | 10/2014 |
| CN | 106464945 A | 2/2017 |
| CN | 107438051 A | 12/2017 |
| CN | 107925669 A | 4/2018 |
| CN | 108605160 A | 9/2018 |
| EP | 3416396 A1 | 12/2018 |
| GB | 2516112 A | 1/2015 |
| JP | 2011119971 A | 6/2011 |
| WO | 2011139305 A1 | 11/2011 |
| WO | 2013002818 A1 | 1/2013 |
| WO | 2013019903 | 2/2013 |
| WO | 2014107580 A1 | 7/2014 |
| WO | 2016141165 A1 | 9/2016 |
| WO | 2016205670 A1 | 12/2016 |
| WO | 2017138387 A1 | 8/2017 |
| WO | 2017169890 A1 | 10/2017 |

OTHER PUBLICATIONS

Freed N., et al., "Media Type Specifications and Registration Procedures", Internet Engineering Task Force (IETF), RFC 6838, Nov. 5, 2019, pp. 1-33.
"Guidelines for Implementations: DASH-IF Interoperability Points," Version 4.0, DASH Industry Forum, Dec. 12, 2016, 168 pages.
ISO/IEC FDIS 23009-1:2019(E): "Information technology—Dynamic Adaptive Streaming Over HTTP (DASH)—Part 1: Media Presentation Description and Segment Formats", Aug. 2019, 295 Pages.
ITU-T H.265, Series H: Audiovisual and Multimedia Systems, Infrastructure of audiovisual services—Coding of moving video, Advanced video coding for generic audiovisual services, The International Telecommunication Union. Dec. 2016, 664 pp.
"Media Source Extensions ™", Nov. 5, 2019, pp. 1-78, Retrieved from the Internet: https://www.w3.org/TR/media-source/#dom-mediasource-addsourcebuffer.
Paila T., et al., "FLUTE-File Delivery over Unidirectional Transport," Network Working Group, RFC 6726, Nov. 2012, 46 Pages, Retrieved from the Internet http://tools.ietf.org/html/rfc6726.
U.S. Appl. No. 16/591,097, filed Oct. 2, 2019, 48 pages.
International Search Report and Written Opinion—PCT/US2019/054524—ISA/EPO—Dec. 6, 2019.
Waller S., "DASH-IF CR-Low-Latency-Live-v0.3.3", DVB, Digital Video Broadcasting, C/O EBU—17A AncienneRoute—CH-1218 Grand Saconnex, Geneva—Switzerland, Sep. 10, 2018 (Sep. 10, 2018), XP017856101, 17 Pages, Retrieved from the Internet: URL:https://www.dvb.org/resources/restricted/members/documents/TM-IPI/TM-IPI3412_DASH-IF-CR-Low-Latency- . . . [retrieved on Sep. 10, 2018], p. 1, paragraph 4.x.1-p. 6, paragraph 4.x.3.3, p. 10, paragraph 4.x.4.3, p. 15, paragraph 4.x.5.
"Digital Video Broadcasting (DVB); MPEG-DASH Profile for Transport of ISO BMFF-Based DVB Services over IP Based Networks", ETSI Technical Specification, European Telecommunications Standards Institute (ETSI), 650, Route Des Lucioles; F-06921 Sophia-Antipolis ; France, vol. BROADCAS, No. V1.2.1, Mar. 29, 2018, XP014319318, pp. 1-113, Retrieved from the Internet: URL:http://www.etsi.org/delivertetsi_ts/103200_103299/103285/01.02.01_60/ts_103285v010201p.pdf [retrieved on Mar. 29, 2018].
International Standard., "Information Technology—Dynamic Adaptive Streaming over HTTP (DASH)—Part 1: Media Presentation Description and Segment Formats", MPEG Meeting; Jan. 16, 2017-Jan. 20, 2017; Geneva; (Motion Picture Expert Group or ISO/IEC JTC1/SC29/WG11), No. N16666, ISO/IEC 23009-1, Third Edition, XP030023329, Mar. 28, 2017, pp. 1-208.
Universal Mobile Telecommunications System (UMTS); LTE; Transparent end-to-end Packet-switched Streaming Service (PSS); Protocols and codecs (3GPP TS 26.234 version 9.3.0 Release 9), Technical Specification, European Telecommunications Standards Institute (ETSI), 650, Route Des Lucioles; F-06921 Sophia-Antipolis; France, vol. 3GPP SA, No. V9.3.0, Jun. 1, 2010 (Jun. 1, 2010), XP014047290, pp. 1-178.
Chen J., et al., "Algorithm Description of Joint Exploration Test Model 1", Joint Video Exploration Team (JVET) of ITU-T SG 16 WP 3 and ISO/IEC JTC 1/SC 29/WG 11, 1nd Meeting: Geneva, CH, Oct. 19-21, 2015, 27 Pages, JVET-A1001.
Qualcomm Incorporated: "DASH Service Description", ISO/IEC JTC1/SC29/WG11 MPEG2018/M44861, Oct. 2018, Macao, CN, 7 pages.
Stockhammer T, et al., "MPEG DASH: The Enabler Standard for Video Delivery Over the Internet," in SMPTE Motion Imaging Journal, vol. 121, No. 5, pp. 40-46, Jul. 2012, DOI: 10.5594/j18188.

(56) References Cited

OTHER PUBLICATIONS

Weil N: "The State of MPEG-DASH 2016" in Streaming Media, Mar. 29, 2016, 8 pp.
Taiwan Search Report—TW108135927—TIPO—Jan. 13, 2023, 2 Pages.

* cited by examiner

SERVICE DESCRIPTION FOR STREAMING MEDIA DATA

This application claims the benefit of U.S. Provisional Application No. 62/740,765, filed Oct. 3, 2018, the entire contents of which are hereby incorporated by reference.

TECHNICAL FIELD

This disclosure relates to storage and transport of encoded video data.

BACKGROUND

Digital video capabilities can be incorporated into a wide range of devices, including digital televisions, digital direct broadcast systems, wireless broadcast systems, personal digital assistants (PDAs), laptop or desktop computers, digital cameras, digital recording devices, digital media players, video gaming devices, video game consoles, cellular or satellite radio telephones, video teleconferencing devices, and the like. Digital video devices implement video compression techniques, such as those described in the standards defined by MPEG-2, MPEG-4, ITU-T H.263 or ITU-T H.264/MPEG-4, Part 10, Advanced Video Coding (AVC), ITU-T H.265 (also referred to as High Efficiency Video Coding (HEVC)), and extensions of such standards, to transmit and receive digital video information more efficiently.

Video compression techniques perform spatial prediction and/or temporal prediction to reduce or remove redundancy inherent in video sequences. For block-based video coding, a video frame or slice may be partitioned into macroblocks. Each macroblock can be further partitioned. Macroblocks in an intra-coded (I) frame or slice are encoded using spatial prediction with respect to neighboring macroblocks. Macroblocks in an inter-coded (P or B) frame or slice may use spatial prediction with respect to neighboring macroblocks in the same frame or slice or temporal prediction with respect to other reference frames.

After video data has been encoded, the video data may be packetized for transmission or storage. The video data may be assembled into a video file conforming to any of a variety of standards, such as the International Organization for Standardization (ISO) base media file format and extensions thereof, such as AVC.

SUMMARY

In general, this disclosure describes techniques for transmitting data describing a media presentation. A server device may indicate service description data for the media presentation representing presentation settings that should provide a preferential user experience. A client device may use the service description data to modify playback of the media data. For example, for some presentations (e.g., live events, such as sporting events), it may be better for the user to experience events of the presentations as soon as they happen, such that if rebuffering is experienced, some previously received media data is discarded. For other presentations (e.g., movies or television shows), it may be better for the user to experience the entire presentation, such that if rebuffering is experienced, the previously received media data is presented. Likewise, the service description may specify one or more target latencies for the media presentation, corresponding qualities for the latencies, and playback rate adjustments (e.g., acceleration or deceleration rates) to achieve and maintain the latencies.

In one example, a method of retrieving media data includes retrieving a service description including data including one or more playback preferences for a corresponding media presentation, the playback preferences including a desired end-to-end latency; retrieving media data of the media presentation via a network streaming protocol; and presenting the retrieved media data according to the one or more playback preferences and to achieve the desired end-to-end latency.

In another example, a device for retrieving media data includes a memory configured to store media data of a media presentation; and one or more processors implemented in circuitry and configured to: retrieve a service description including data including one or more playback preferences for the media presentation, the playback preferences including a desired end-to-end latency; retrieve the media data of the media presentation via a network streaming protocol; and present the retrieved media data according to the one or more playback preferences and to achieve the desired end-to-end latency.

In another example, a computer-readable storage medium has stored thereon instructions that, when executed, cause a processor to retrieve a service description including data including one or more playback preferences for a corresponding media presentation, the playback preferences including a desired end-to-end latency; retrieve media data of the media presentation via a network streaming protocol; and present the retrieved media data according to the one or more playback preferences and to achieve the desired end-to-end latency.

In another example, a device for retrieving media data includes means for retrieving a service description including data including one or more playback preferences for a corresponding media presentation, the playback preferences including a desired end-to-end latency; means for retrieving media data of the media presentation via a network streaming protocol; and means for presenting the retrieved media data according to the one or more playback preferences and to achieve the desired end-to-end latency.

In another example, a method of sending media data includes sending a service description including data including one or more playback preferences for a corresponding media presentation to a client device, the playback preferences including a desired end-to-end latency; receiving a request for media data of the media presentation from the client device; and sending the media data of the media presentation to the client device in response to the request for the media data from the client device according to the one or more playback preferences and to achieve the desired end-to-end latency.

In another example, a device for sending media data includes a memory configured to store media data of a media presentation and a service description including one or more playback preferences for the media presentation, the playback preferences including a desired end-to-end latency; and one or more processors implemented in circuitry and configured to: send the service description to a client device; receive a request for the media data of the media presentation from the client device; and send the media data of the media presentation to the client device in response to the request for the media data from the client device according to the one or more playback preferences and to achieve the desired end-to-end latency.

In another example, a computer-readable storage medium has stored thereon instructions that, when executed, cause a processor to send a service description including data including one or more playback preferences for a corresponding media presentation to a client device, the playback preferences including a desired end-to-end latency; receive a request for media data of the media presentation from the client device; and send the media data of the media presentation to the client device in response to the request for the media data from the client device according to the one or more playback preferences and to achieve the desired end-to-end latency.

In another example, a device for sending media data includes means for sending a service description including data including one or more playback preferences for a corresponding media presentation to a client device, the playback preferences including a desired end-to-end latency; means for receiving a request for media data of the media presentation from the client device; and means for sending the media data of the media presentation to the client device in response to the request for the media data from the client device according to the one or more playback preferences and to achieve the desired end-to-end latency.

The details of one or more examples are set forth in the accompanying drawings and the description below. Other features, objects, and advantages will be apparent from the description and drawings, and from the claims.

DETAILED DESCRIPTION

Figure 1:
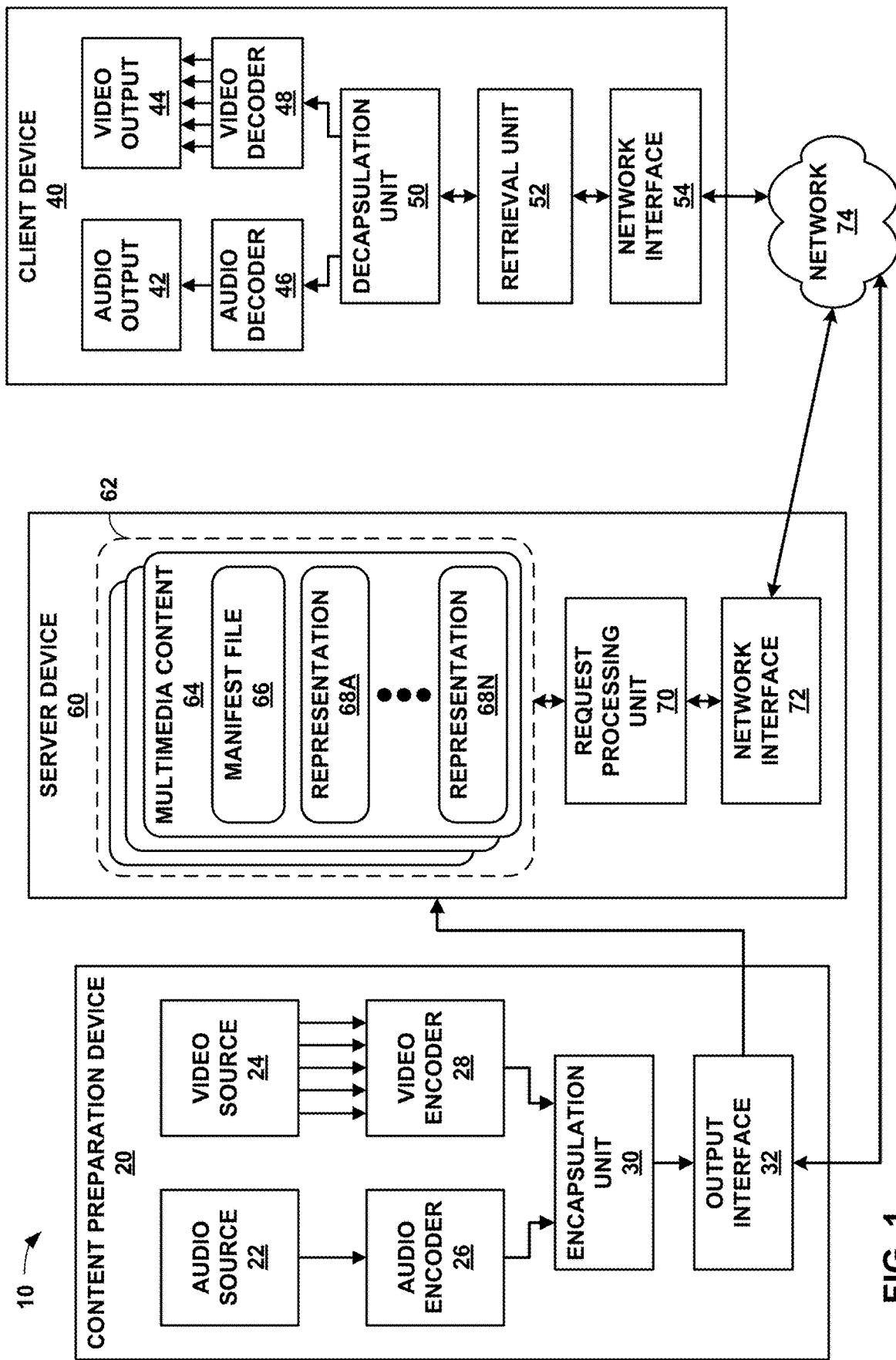
FIG. 1 is a block diagram illustrating an example system that implements techniques for streaming media data over a network according to the techniques of this disclosure.

In general, this disclosure describes techniques for transmitting data describing a media presentation. A server device may indicate service description data for the media presentation representing presentation settings that should provide a preferential user experience. A client device may use the service description data to modify playback of the media data. For example, for some presentations (e.g., live events, such as sporting events), it may be better for the user to experience events of the presentations as soon as they happen, such that if rebuffering is experienced, some previously received media data is discarded. For other presentations (e.g., movies or television shows), it may be better for the user to experience the entire presentation, such that if rebuffering is experienced, the previously received media data is presented.

In general, the techniques of this disclosure may be used for network streaming, such as HTTP streaming (e.g., Dynamic Adaptive Streaming over HTTP (DASH)). In HTTP streaming, frequently used operations include HEAD, GET, and partial GET. The HEAD operation retrieves a header of a file associated with a given uniform resource locator (URL) or uniform resource name (URN), without retrieving a payload associated with the URL or URN. The GET operation retrieves a whole file associated with a given URL or URN. The partial GET operation receives a byte range as an input parameter and retrieves a continuous number of bytes of a file, where the number of bytes correspond to the received byte range. Thus, movie fragments may be provided for HTTP streaming, because a partial GET operation can get one or more individual movie fragments. In a movie fragment, there can be several track fragments of different tracks. In HTTP streaming, a media presentation may be a structured collection of data that is accessible to the client. The client may request and download media data information to present a streaming service to a user.

In the example of streaming 3GPP data using HTTP streaming, there may be multiple representations for video and/or audio data of multimedia content. As explained below, different representations may correspond to different coding characteristics (e.g., different profiles or levels of a video coding standard), different coding standards or extensions of coding standards (such as multiview and/or scalable extensions), or different bitrates. The manifest of such representations may be defined in a Media Presentation Description (MPD) data structure. A media presentation may correspond to a structured collection of data that is accessible to an HTTP streaming client device. The HTTP streaming client device may request and download media data information to present a streaming service to a user of the client device. A media presentation may be described in the MPD data structure, which may include updates of the MPD.

A media presentation may contain a sequence of one or more Periods. Each period may extend until the start of the next Period, or until the end of the media presentation, in the case of the last period. Each period may contain one or more representations for the same media content. A representation may be one of a number of alternative encoded versions of audio, video, timed text, or other such data. The representations may differ by encoding types, e.g., by bitrate, resolution, and/or codec for video data and bitrate, language, and/or codec for audio data. The term representation may be used to refer to a section of encoded audio or video data corresponding to a particular period of the multimedia content and encoded in a particular way.

Representations of a particular period may be assigned to a group indicated by an attribute in the MPD indicative of an adaptation set to which the representations belong. Representations in the same adaptation set are generally considered alternatives to each other, in that a client device can dynamically and seamlessly switch between these representations, e.g., to perform bandwidth adaptation. For example, each representation of video data for a particular period may be assigned to the same adaptation set, such that any of the representations may be selected for decoding to present media data, such as video data or audio data, of the multimedia content for the corresponding period. The media content within one period may be represented by either one representation from group 0, if present, or the combination of at most one representation from each non-zero group, in some examples. Timing data for each representation of a period may be expressed relative to the start time of the period.

A representation may include one or more segments. Each representation may include an initialization segment, or each segment of a representation may be self-initializing. When present, the initialization segment may contain initialization information for accessing the representation. In general, the initialization segment does not contain media data. A segment may be uniquely referenced by an identifier, such as a uniform resource locator (URL), uniform resource name (URN), or uniform resource identifier (URI). The MPD may provide the identifiers for each segment. In some examples, the MPD may also provide byte ranges in the form of a range attribute, which may correspond to the data for a segment within a file accessible by the URL, URN, or URI.

Different representations may be selected for substantially simultaneous retrieval for different types of media data. For example, a client device may select an audio representation, a video representation, and a timed text representation from which to retrieve segments. In some examples, the client device may select particular adaptation sets for performing bandwidth adaptation. That is, the client device may select an adaptation set including video representations, an adaptation set including audio representations, and/or an adaptation set including timed text. Alternatively, the client device may select adaptation sets for certain types of media (e.g., video), and directly select representations for other types of media (e.g., audio and/or timed text).

DASH-IF (Dash Industry Forum) and Digital Video Broadcasting (DVB) currently developing DASH-based solutions for low-latency streaming. The key issue in the work is the ability that services can be offered such that the end-to-end latency is bounded and on par with other TV distribution means. Different latencies may be considered. For example, End-to-End Latency (EEL) describes the latency for an action that is captured by the camera until its visibility on the remote screen. As another example, Encoding+Distribution Latency (EDL) describes the latency of the linear playout output (which typically serves as input to distribution encoder(s)) to the screen.

In addition to the end-to-end latency, also the start-up delay, sometimes referred to as channel change time, may be relevant. In this case, two different delays may be differentiated. Live Edge Start-up Delay (LSD) describes the time between a user action (service access or service join) and the time until the first media sample of the service is perceived by the user when joining at the live edge. Seek Start-up Delay (SSD) describes the time between a user action (service access or service join) and the time until the first media sample of the service is perceived by the user when seeking to a time shift buffer.

In addition, yet another aspect is the ability to synchronize presentation accurately across different devices for consistent user experience.

DVB, for example, targets technologies that enable (but do not require) the following goals:
  Encoder to Screen Latency of 3.5 seconds.
  Live Edge Start-up Delay in the order of 1 second or less.
  Presentation of a media time at a specific wall-clock time within 500 ms tolerance.

Another goal of DVB is that a service offering can be provided such that it is backward-compatible to existing clients, which then would observe a longer latency.

Yet another requirement in DVB is the ability to vary a service to not necessarily have to run at the lowest required latency, such that if it is beneficial for network resources and coding efficiency, the service may be setup to operate with longer latency. This decision may be taken by the device based on its environment, or it may be taken by the service provider, or both.

FIG. 1 is a block diagram illustrating an example system 10 that implements techniques for streaming media data over a network. In this example, system 10 includes content preparation device 20, server device 60, and client device 40. Client device 40 and server device 60 are communicatively coupled by network 74, which may comprise the Internet. In some examples, content preparation device 20 and server device 60 may also be coupled by network 74 or another network, or may be directly communicatively coupled. In some examples, content preparation device 20 and server device 60 may comprise the same device.

Content preparation device 20, in the example of FIG. 1, comprises audio source 22 and video source 24. Audio source 22 may comprise, for example, a microphone that produces electrical signals representative of captured audio data to be encoded by audio encoder 26. Alternatively, audio source 22 may comprise a storage medium storing previously recorded audio data, an audio data generator such as a computerized synthesizer, or any other source of audio data. Video source 24 may comprise a video camera that produces video data to be encoded by video encoder 28, a storage medium encoded with previously recorded video data, a video data generation unit such as a computer graphics source, or any other source of video data. Content preparation device 20 is not necessarily communicatively coupled to server device 60 in all examples, but may store multimedia content to a separate medium that is read by server device 60.

Raw audio and video data may comprise analog or digital data. Analog data may be digitized before being encoded by audio encoder 26 and/or video encoder 28. Audio source 22 may obtain audio data from a speaking participant while the speaking participant is speaking, and video source 24 may simultaneously obtain video data of the speaking participant. In other examples, audio source 22 may comprise a computer-readable storage medium comprising stored audio data, and video source 24 may comprise a computer-readable storage medium comprising stored video data. In this manner, the techniques described in this disclosure may be applied to live, streaming, real-time audio and video data or to archived, pre-recorded audio and video data.

Audio frames that correspond to video frames are generally audio frames containing audio data that was captured (or generated) by audio source 22 contemporaneously with video data captured (or generated) by video source 24 that is contained within the video frames. For example, while a speaking participant generally produces audio data by speaking, audio source 22 captures the audio data, and video source 24 captures video data of the speaking participant at the same time, that is, while audio source 22 is capturing the audio data. Hence, an audio frame may temporally correspond to one or more particular video frames. Accordingly, an audio frame corresponding to a video frame generally corresponds to a situation in which audio data and video data were captured at the same time and for which an audio frame and a video frame comprise, respectively, the audio data and the video data that was captured at the same time.

In some examples, audio encoder 26 may encode a timestamp in each encoded audio frame that represents a time at which the audio data for the encoded audio frame was recorded, and similarly, video encoder 28 may encode a timestamp in each encoded video frame that represents a time at which the video data for an encoded video frame was recorded. In such examples, an audio frame corresponding to a video frame may comprise an audio frame comprising a timestamp and a video frame comprising the same timestamp. Content preparation device 20 may include an internal clock from which audio encoder 26 and/or video encoder 28 may generate the timestamps, or that audio source 22 and video source 24 may use to associate audio and video data, respectively, with a timestamp.

In some examples, audio source 22 may send data to audio encoder 26 corresponding to a time at which audio data was recorded, and video source 24 may send data to video encoder 28 corresponding to a time at which video data was recorded. In some examples, audio encoder 26 may encode a sequence identifier in encoded audio data to indicate a relative temporal ordering of encoded audio data but without necessarily indicating an absolute time at which the audio data was recorded, and similarly, video encoder 28 may also use sequence identifiers to indicate a relative temporal ordering of encoded video data. Similarly, in some examples, a sequence identifier may be mapped or otherwise correlated with a timestamp.

Audio encoder 26 generally produces a stream of encoded audio data, while video encoder 28 produces a stream of encoded video data. Each individual stream of data (whether audio or video) may be referred to as an elementary stream. An elementary stream is a single, digitally coded (possibly compressed) component of a representation. For example, the coded video or audio part of the representation can be an elementary stream. An elementary stream may be converted into a packetized elementary stream (PES) before being encapsulated within a video file. Within the same representation, a stream ID may be used to distinguish the PES-packets belonging to one elementary stream from the other. The basic unit of data of an elementary stream is a packetized elementary stream (PES) packet. Thus, coded video data generally corresponds to elementary video streams. Similarly, audio data corresponds to one or more respective elementary streams.

Many video coding standards, such as ITU-T H.264/AVC and the upcoming High Efficiency Video Coding (HEVC) standard, define the syntax, semantics, and decoding process for error-free bitstreams, any of which conform to a certain profile or level. Video coding standards typically do not specify the encoder, but the encoder is tasked with guaranteeing that the generated bitstreams are standard-compliant for a decoder. In the context of video coding standards, a "profile" corresponds to a subset of algorithms, features, or tools and constraints that apply to them. As defined by the H.264 standard, for example, a "profile" is a subset of the entire bitstream syntax that is specified by the H.264 standard. A "level" corresponds to the limitations of the decoder resource consumption, such as, for example, decoder memory and computation, which are related to the resolution of the pictures, bit rate, and block processing rate. A profile may be signaled with a profile_idc (profile indicator) value, while a level may be signaled with a level_idc (level indicator) value.

The H.264 standard, for example, recognizes that, within the bounds imposed by the syntax of a given profile, it is still possible to require a large variation in the performance of encoders and decoders depending upon the values taken by syntax elements in the bitstream such as the specified size of the decoded pictures. The H.264 standard further recognizes that, in many applications, it is neither practical nor economical to implement a decoder capable of dealing with all hypothetical uses of the syntax within a particular profile. Accordingly, the H.264 standard defines a "level" as a specified set of constraints imposed on values of the syntax elements in the bitstream. These constraints may be simple limits on values. Alternatively, these constraints may take the form of constraints on arithmetic combinations of values (e.g., picture width multiplied by picture height multiplied by number of pictures decoded per second). The H.264 standard further provides that individual implementations may support a different level for each supported profile.

A decoder conforming to a profile ordinarily supports all the features defined in the profile. For example, as a coding feature, B-picture coding is not supported in the baseline profile of H.264/AVC but is supported in other profiles of H.264/AVC. A decoder conforming to a level should be capable of decoding any bitstream that does not require resources beyond the limitations defined in the level. Definitions of profiles and levels may be helpful for interpretability. For example, during video transmission, a pair of profile and level definitions may be negotiated and agreed for a whole transmission session. More specifically, in H.264/AVC, a level may define limitations on the number of macroblocks that need to be processed, decoded picture buffer (DPB) size, coded picture buffer (CPB) size, vertical motion vector range, maximum number of motion vectors per two consecutive MBs, and whether a B-block can have sub-macroblock partitions less than 8×8 pixels. In this manner, a decoder may determine whether the decoder is capable of properly decoding the bitstream.

In the example of FIG. 1, encapsulation unit 30 of content preparation device 20 receives elementary streams comprising coded video data from video encoder 28 and elementary streams comprising coded audio data from audio encoder 26. In some examples, video encoder 28 and audio encoder 26 may each include packetizers for forming PES packets from encoded data. In other examples, video encoder 28 and audio encoder 26 may each interface with respective packetizers for forming PES packets from encoded data. In still other examples, encapsulation unit 30 may include packetizers for forming PES packets from encoded audio and video data.

Video encoder 28 may encode video data of multimedia content in a variety of ways, to produce different representations of the multimedia content at various bitrates and with various characteristics, such as pixel resolutions, frame rates, conformance to various coding standards, conformance to various profiles and/or levels of profiles for various coding standards, representations having one or multiple views (e.g., for two-dimensional or three-dimensional playback), or other such characteristics. A representation, as used in this disclosure, may comprise one of audio data, video data, text data (e.g., for closed captions), or other such data. The representation may include an elementary stream, such as an audio elementary stream or a video elementary stream. Each PES packet may include a stream_id that identifies the elementary stream to which the PES packet belongs. Encapsulation unit 30 is responsible for assembling elementary streams into video files (e.g., segments) of various representations.

Encapsulation unit 30 receives PES packets for elementary streams of a representation from audio encoder 26 and video encoder 28 and forms corresponding network abstraction layer (NAL) units from the PES packets. Coded video segments may be organized into NAL units, which provide a "network-friendly" video representation addressing applications such as video telephony, storage, broadcast, or streaming. NAL units can be categorized to Video Coding Layer (VCL) NAL units and non-VCL NAL units. VCL units may contain the core compression engine and may include block, macroblock, and/or slice level data. Other NAL units may be non-VCL NAL units. In some examples, a coded picture in one time instance, normally presented as a primary coded picture, may be contained in an access unit, which may include one or more NAL units.

Non-VCL NAL units may include parameter set NAL units and SEI NAL units, among others. Parameter sets may contain sequence-level header information (in sequence parameter sets (SPS)) and the infrequently changing picture-level header information (in picture parameter sets (PPS)). With parameter sets (e.g., PPS and SPS), infrequently changing information need not to be repeated for each sequence or picture; hence, coding efficiency may be improved. Furthermore, the use of parameter sets may enable out-of-band transmission of the important header information, avoiding the need for redundant transmissions for error resilience. In out-of-band transmission examples, parameter set NAL units may be transmitted on a different channel than other NAL units, such as SEI NAL units.

Supplemental Enhancement Information (SEI) may contain information that is not necessary for decoding the coded pictures samples from VCL NAL units, but may assist in processes related to decoding, display, error resilience, and other purposes. SEI messages may be contained in non-VCL NAL units. SEI messages are the normative part of some standard specifications, and thus are not always mandatory for standard compliant decoder implementation. SEI messages may be sequence level SEI messages or picture level SEI messages. Some sequence level information may be contained in SEI messages, such as scalability information SEI messages in the example of SVC and view scalability information SEI messages in MVC. These example SEI messages may convey information on, e.g., extraction of operation points and characteristics of the operation points. In addition, encapsulation unit 30 may form a manifest file, such as a media presentation descriptor (MPD) that describes characteristics of the representations. Encapsulation unit 30 may format the MPD according to extensible markup language (XML).

Encapsulation unit 30 may provide data for one or more representations of multimedia content, along with the manifest file (e.g., the MPD) to output interface 32. Output interface 32 may comprise a network interface or an interface for writing to a storage medium, such as a universal serial bus (USB) interface, a CD or DVD writer or burner, an interface to magnetic or flash storage media, or other interfaces for storing or transmitting media data. Encapsulation unit 30 may provide data of each of the representations of multimedia content to output interface 32, which may send the data to server device 60 via network transmission or storage media. In the example of FIG. 1, server device 60 includes storage medium 62 that stores various multimedia contents 64, each including a respective manifest file 66 and one or more representations 68A-68N (representations 68). In some examples, output interface 32 may also send data directly to network 74.

In some examples, representations 68 may be separated into adaptation sets. That is, various subsets of representations 68 may include respective common sets of characteristics, such as codec, profile and level, resolution, number of views, file format for segments, text type information that may identify a language or other characteristics of text to be displayed with the representation and/or audio data to be decoded and presented, e.g., by speakers, camera angle information that may describe a camera angle or real-world camera perspective of a scene for representations in the adaptation set, rating information that describes content suitability for particular audiences, or the like.

Manifest file 66 may include data indicative of the subsets of representations 68 corresponding to particular adaptation sets, as well as common characteristics for the adaptation sets. Manifest file 66 may also include data representative of individual characteristics, such as bitrates, for individual representations of adaptation sets. In this manner, an adaptation set may provide for simplified network bandwidth adaptation. Representations in an adaptation set may be indicated using child elements of an adaptation set element of manifest file 66.

Server device 60 includes request processing unit 70 and network interface 72. In some examples, server device 60 may include a plurality of network interfaces. Furthermore, any or all of the features of server device 60 may be implemented on other devices of a content delivery network, such as routers, bridges, proxy devices, switches, or other devices. In some examples, intermediate devices of a content delivery network may cache data of multimedia content 64, and include components that conform substantially to those of server device 60. In general, network interface 72 is configured to send and receive data via network 74.

Request processing unit 70 is configured to receive network requests from client devices, such as client device 40, for data of storage medium 62. For example, request processing unit 70 may implement hypertext transfer protocol (HTTP) version 1.1, as described in RFC 2616, "Hypertext Transfer Protocol—HTTP/1.1," by R. Fielding et al, Network Working Group, IETF, June 1999. That is, request processing unit 70 may be configured to receive HTTP GET or partial GET requests and provide data of multimedia content 64 in response to the requests. The requests may specify a segment of one of representations 68, e.g., using a URL of the segment. In some examples, the requests may also specify one or more byte ranges of the segment, thus comprising partial GET requests. Request processing unit 70 may further be configured to service HTTP HEAD requests to provide header data of a segment of one of representations 68. In any case, request processing unit 70 may be configured to process the requests to provide requested data to a requesting device, such as client device 40.

Additionally or alternatively, request processing unit 70 may be configured to deliver media data via a broadcast or multicast protocol, such as eMBMS. Content preparation device 20 may create DASH segments and/or sub-segments in substantially the same way as described, but server device 60 may deliver these segments or sub-segments using eMBMS or another broadcast or multicast network transport protocol. For example, request processing unit 70 may be configured to receive a multicast group join request from client device 40. That is, server device 60 may advertise an Internet protocol (IP) address associated with a multicast group to client devices, including client device 40, associated with particular media content (e.g., a broadcast of a live event). Client device 40, in turn, may submit a request to join the multicast group. This request may be propagated throughout network 74, e.g., routers making up network 74, such that the routers are caused to direct traffic destined for the IP address associated with the multicast group to subscribing client devices, such as client device 40.

As illustrated in the example of FIG. 1, multimedia content 64 includes manifest file 66, which may correspond to a media presentation description (MPD). Manifest file 66 may contain descriptions of different alternative representations 68 (e.g., video services with different qualities) and the description may include, e.g., codec information, a profile value, a level value, a bitrate, and other descriptive characteristics of representations 68. Client device 40 may retrieve the MPD of a media presentation to determine how to access segments of representations 68.

In particular, retrieval unit 52 may retrieve configuration data (not shown) of client device 40 to determine decoding capabilities of video decoder 48 and rendering capabilities of video output 44. The configuration data may also include any or all of a language preference selected by a user of client device 40, one or more camera perspectives corresponding to depth preferences set by the user of client device 40, and/or a rating preference selected by the user of client device 40. Retrieval unit 52 may comprise, for example, a web browser or a media client configured to submit HTTP GET and partial GET requests. Retrieval unit 52 may correspond to software instructions executed by one or more processors or processing units (not shown) of client device 40. In some examples, all or portions of the functionality described with respect to retrieval unit 52 may be implemented in hardware, or a combination of hardware, software, and/or firmware, where requisite hardware may be provided to execute instructions for software or firmware.

Retrieval unit 52 may compare the decoding and rendering capabilities of client device 40 to characteristics of representations 68 indicated by information of manifest file 66. Retrieval unit 52 may initially retrieve at least a portion of manifest file 66 to determine characteristics of representations 68. For example, retrieval unit 52 may request a portion of manifest file 66 that describes characteristics of one or more adaptation sets. Retrieval unit 52 may select a subset of representations 68 (e.g., an adaptation set) having characteristics that can be satisfied by the coding and rendering capabilities of client device 40. Retrieval unit 52 may then determine bitrates for representations in the adaptation set, determine a currently available amount of network bandwidth, and retrieve segments from one of the representations having a bitrate that can be satisfied by the network bandwidth.

In general, higher bitrate representations may yield higher quality video playback, while lower bitrate representations may provide sufficient quality video playback when available network bandwidth decreases. Accordingly, when available network bandwidth is relatively high, retrieval unit 52 may retrieve data from relatively high bitrate representations, whereas when available network bandwidth is low, retrieval unit 52 may retrieve data from relatively low bitrate representations. In this manner, client device 40 may stream multimedia data over network 74 while also adapting to changing network bandwidth availability of network 74.

Additionally or alternatively, retrieval unit 52 may be configured to receive data in accordance with a broadcast or multicast network protocol, such as eMBMS or IP multicast. In such examples, retrieval unit 52 may submit a request to join a multicast network group associated with particular media content. After joining the multicast group, retrieval unit 52 may receive data of the multicast group without further requests issued to server device 60 or content preparation device 20. Retrieval unit 52 may submit a request to leave the multicast group when data of the multicast group is no longer needed, e.g., to stop playback or to change channels to a different multicast group.

Network interface 54 may receive and provide data of segments of a selected representation to retrieval unit 52, which may in turn provide the segments to decapsulation unit 50. Decapsulation unit 50 may decapsulate elements of a video file into constituent PES streams, depacketize the PES streams to retrieve encoded data, and send the encoded data to either audio decoder 46 or video decoder 48, depending on whether the encoded data is part of an audio or video stream, e.g., as indicated by PES packet headers of the stream. Audio decoder 46 decodes encoded audio data and sends the decoded audio data to audio output 42, while video decoder 48 decodes encoded video data and sends the decoded video data, which may include a plurality of views of a stream, to video output 44.

Video encoder 28, video decoder 48, audio encoder 26, audio decoder 46, encapsulation unit 30, retrieval unit 52, and decapsulation unit 50 each may be implemented as any of a variety of suitable processing circuitry, as applicable, such as one or more microprocessors, digital signal processors (DSPs), application specific integrated circuits (ASICs), field programmable gate arrays (FPGAs), discrete logic circuitry, software, hardware, firmware or any combinations thereof. Each of video encoder 28 and video decoder 48 may be included in one or more encoders or decoders, either of which may be integrated as part of a combined video encoder/decoder (CODEC). Likewise, each of audio encoder 26 and audio decoder 46 may be included in one or more encoders or decoders, either of which may be integrated as part of a combined CODEC. An apparatus including video encoder 28, video decoder 48, audio encoder 26, audio decoder 46, encapsulation unit 30, retrieval unit 52, and/or decapsulation unit 50 may comprise an integrated circuit, a microprocessor, and/or a wireless communication device, such as a cellular telephone.

Client device 40, server device 60, and/or content preparation device 20 may be configured to operate in accordance with the techniques of this disclosure. For purposes of example, this disclosure describes these techniques with respect to client device 40 and server device 60. However, it should be understood that content preparation device 20 may be configured to perform these techniques, instead of (or in addition to) server device 60.

Encapsulation unit 30 may form NAL units comprising a header that identifies a program to which the NAL unit belongs, as well as a payload, e.g., audio data, video data, or data that describes the transport or program stream to which the NAL unit corresponds. For example, in H.264/AVC, a NAL unit includes a 1-byte header and a payload of varying size. A NAL unit including video data in its payload may comprise various granularity levels of video data. For example, a NAL unit may comprise a block of video data, a plurality of blocks, a slice of video data, or an entire picture of video data. Encapsulation unit 30 may receive encoded video data from video encoder 28 in the form of PES packets of elementary streams. Encapsulation unit 30 may associate each elementary stream with a corresponding program.

Encapsulation unit 30 may also assemble access units from a plurality of NAL units. In general, an access unit may comprise one or more NAL units for representing a frame of video data, as well as audio data corresponding to the frame when such audio data is available. An access unit generally includes all NAL units for one output time instance, e.g., all audio and video data for one time instance. For example, if each view has a frame rate of 20 frames per second (fps), then each time instance may correspond to a time interval of 0.05 seconds. During this time interval, the specific frames for all views of the same access unit (the same time instance) may be rendered simultaneously. In one example, an access unit may comprise a coded picture in one time instance, which may be presented as a primary coded picture.

Accordingly, an access unit may comprise all audio and video frames of a common temporal instance, e.g., all views corresponding to time X. This disclosure also refers to an encoded picture of a particular view as a "view component." That is, a view component may comprise an encoded picture (or frame) for a particular view at a particular time. Accordingly, an access unit may be defined as comprising all view components of a common temporal instance. The decoding order of access units need not necessarily be the same as the output or display order.

A media presentation may include a media presentation description (MPD), which may contain descriptions of different alternative representations (e.g., video services with different qualities) and the description may include, e.g., codec information, a profile value, and a level value. An MPD is one example of a manifest file, such as manifest file 66. Client device 40 may retrieve the MPD of a media presentation to determine how to access movie fragments of various presentations. Movie fragments may be located in movie fragment boxes (moof boxes) of video files.

Manifest file 66 (which may comprise, for example, an MPD) may advertise availability of segments of representations 68. That is, the MPD may include information indicating the wall-clock time at which a first segment of one of representations 68 becomes available, as well as information indicating the durations of segments within representations 68. In this manner, retrieval unit 52 of client device 40 may determine when each segment is available, based on the starting time as well as the durations of the segments preceding a particular segment.

After encapsulation unit 30 has assembled NAL units and/or access units into a video file based on received data, encapsulation unit 30 passes the video file to output interface 32 for output. In some examples, encapsulation unit 30 may store the video file locally or send the video file to a remote server via output interface 32, rather than sending the video file directly to client device 40. Output interface 32 may comprise, for example, a transmitter, a transceiver, a device for writing data to a computer-readable medium such as, for example, an optical drive, a magnetic media drive (e.g., floppy drive), a universal serial bus (USB) port, a network interface, or other output interface. Output interface 32 outputs the video file to a computer-readable medium, such as, for example, a transmission signal, a magnetic medium, an optical medium, a memory, a flash drive, or other computer-readable medium.

Network interface 54 may receive a NAL unit or access unit via network 74 and provide the NAL unit or access unit to decapsulation unit 50, via retrieval unit 52. Decapsulation unit 50 may decapsulate a elements of a video file into constituent PES streams, depacketize the PES streams to retrieve encoded data, and send the encoded data to either audio decoder 46 or video decoder 48, depending on whether the encoded data is part of an audio or video stream, e.g., as indicated by PES packet headers of the stream. Audio decoder 46 decodes encoded audio data and sends the decoded audio data to audio output 42, while video decoder 48 decodes encoded video data and sends the decoded video data, which may include a plurality of views of a stream, to video output 44.

In accordance with the techniques of this disclosure, as discussed in greater detail below, a media presentation may have associated playback recommendations for a higher quality user experience. For example, for a live event, it may be desirable to see the event as soon as possible, such as a sporting event or newsworthy event. For live events, it is often desirable to minimize latency between the event occurring and transmission, reception, and playback of media data representing the event. Content preparation device 20 (e.g., encapsulation unit 30) may prepare a service description specifying one or more target latencies (e.g., a desired end-to-end latency) and techniques for achieving the latencies. For example, content preparation device 20 may indicate playback acceleration or deceleration rates in the service description, which client device 40 may use to adjust the playback rate to maintain the desired end-to-end latency without negatively impacting playback for a user's experience.

Thus, client device 40 (e.g., retrieval unit 52) may adjust playback according to the service description in order to achieve the desired end-to-end latency. For example, if a buffer of memory of retrieval unit 52 is filling slowly relative to playback, retrieval unit 52 may decelerate the playback rate according to the service description. By contrast, if the buffer is filling too quickly, retrieval unit 52 may accelerate the playback rate according to the service description.

Retrieval unit 52 may also use the service description to determine join behavior for the media presentation. For example, if the media presentation is a live event, retrieval unit 52 may determine that the service description indicates a join behavior of joining at a live edge of the media presentation, i.e., at a point in the media presentation at which media data is most recently available, as opposed to the beginning of the media presentation. The service description may also specify perceptual qualities for the media presentation associated with various latencies, as well as a target latency associated with a device type for client device 40 (e.g., whether client device 40 is a cellular phone, a computer terminal, a television, a projector, or the like).

In this manner, client device 40 represents an example of a device for retrieving media data including a memory configured to store media data of a media presentation; and one or more processors implemented in circuitry and configured to: retrieve a service description including data including one or more playback preferences for the media presentation, the playback preferences including a desired end-to-end latency; retrieve the media data of the media presentation via a network streaming protocol; and present the retrieved media data according to the one or more playback preferences and to achieve the desired end-to-end latency.

Likewise, content preparation device 20 and server device 60 represent examples of a device for sending media data including a memory configured to store media data of a media presentation and a service description including one or more playback preferences for the media presentation, the playback preferences including a desired end-to-end latency; and one or more processors implemented in circuitry and configured to: send the service description to a client device; receive a request for the media data of the media presentation from the client device; and send the media data of the media presentation to the client device in response to the request for the media data from the client device according to the one or more playback preferences and to achieve the desired end-to-end latency.

Figure 2:
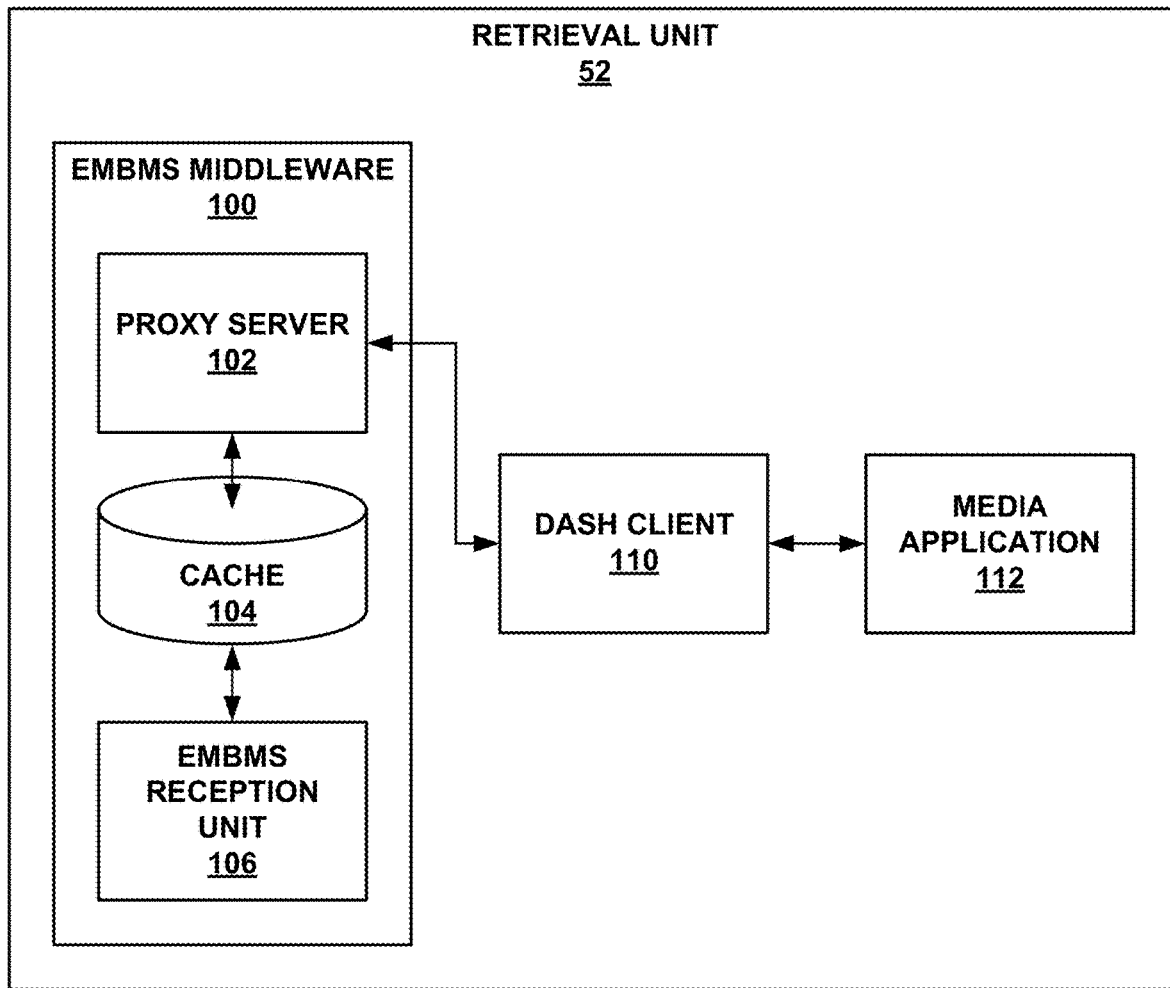
FIG. 2 is a block diagram illustrating an example set of components of a retrieval unit in greater detail.

FIG. 2 is a block diagram illustrating an example set of components of retrieval unit 52 of FIG. 1 in greater detail. In this example, retrieval unit 52 includes eMBMS middleware unit 100, DASH client 110, and media application 112.

In this example, eMBMS middleware unit 100 further includes eMBMS reception unit 106, cache 104, and proxy server unit 102. In this example, eMBMS reception unit 106 is configured to receive data via eMBMS, e.g., according to File Delivery over Unidirectional Transport (FLUTE), described in T. Paila et al., "FLUTE—File Delivery over Unidirectional Transport," Network Working Group, RFC 6726, November 2012, available at tools.ietf.org/html/rfc6726. That is, eMBMS reception unit 106 may receive files via broadcast from, e.g., server device 60, which may act as a broadcast/multicast service center (BM-SC).

As eMBMS middleware unit 100 receives data for files, eMBMS middleware unit may store the received data in cache 104. Cache 104 may comprise a computer-readable storage medium, such as flash memory, a hard disk, RAM, or any other suitable storage medium.

Proxy server unit 102 may act as a server for DASH client 110. For example, proxy server unit 102 may provide a MPD file or other manifest file to DASH client 110. Proxy server unit 102 may advertise availability times for segments in the MPD file, as well as hyperlinks from which the segments can be retrieved. These hyperlinks may include a localhost address prefix corresponding to client device 40 (e.g., 127.0.0.1 for IPv4). In this manner, DASH client 110 may request segments from proxy server unit 102 using HTTP GET or partial GET requests. For example, for a segment available from link http://127.0.0.1/rep1/seg3, DASH client 110 may construct an HTTP GET request that includes a request for http://127.0.0.1/rep1/seg3, and submit the request to proxy server unit 102. Proxy server unit 102 may retrieve requested data from cache 104 and provide the data to DASH client 110 in response to such requests. Alternatively, DASH client 110 may retrieve media data via unicast from a server device, such as server device 60. DASH client 110 may use cache 104 as a buffer for storing retrieved media data until the media data is ready to be played.

Figure 3:
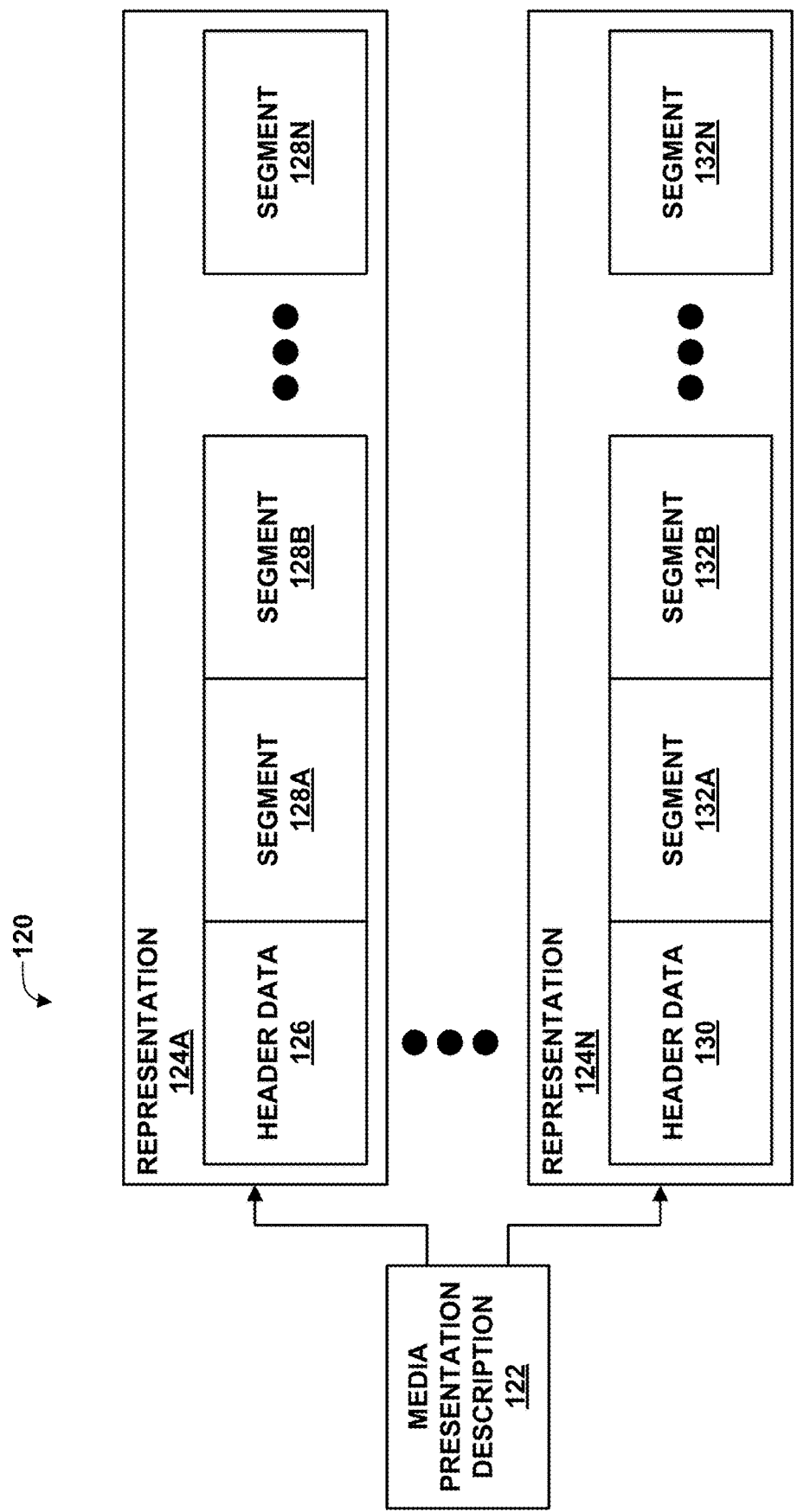
FIG. 3 is a conceptual diagram illustrating elements of example multimedia content.

FIG. 3 is a conceptual diagram illustrating elements of example multimedia content 120. Multimedia content 120 may correspond to multimedia content 64 (FIG. 1), or another multimedia content stored in storage medium 62. In the example of FIG. 3, multimedia content 120 includes media presentation description (MPD) 122 and a plurality of representations 124A-124N (representations 124). Representation 124A includes optional header data 126 and segments 128A-128N (segments 128), while representation 124N includes optional header data 130 and segments 132A-132N (segments 132). The letter N is used to designate the last movie fragment in each of representations 124 as a matter of convenience. In some examples, there may be different numbers of movie fragments between representations 124.

MPD 122 may comprise a data structure separate from representations 124. MPD 122 may correspond to manifest file 66 of FIG. 1. Likewise, representations 124 may correspond to representations 68 of FIG. 1. In general, MPD 122 may include data that generally describes characteristics of representations 124, such as coding and rendering characteristics, adaptation sets, a profile to which MPD 122 corresponds, text type information, camera angle information, rating information, trick mode information (e.g., information indicative of representations that include temporal sub-sequences), and/or information for retrieving remote periods (e.g., for targeted advertisement insertion into media content during playback).

Header data 126, when present, may describe characteristics of segments 128, e.g., temporal locations of random access points (RAPs, also referred to as stream access points (SAPs)), which of segments 128 includes random access points, byte offsets to random access points within segments 128, uniform resource locators (URLs) of segments 128, or other aspects of segments 128. Header data 130, when present, may describe similar characteristics for segments 132. Additionally or alternatively, such characteristics may be fully included within MPD 122.

Segments 128, 132 include one or more coded video samples, each of which may include frames or slices of video data. Each of the coded video samples of segments 128 may have similar characteristics, e.g., height, width, and bandwidth requirements. Such characteristics may be described by data of MPD 122, though such data is not illustrated in the example of FIG. 3. MPD 122 may include characteristics as described by the 3GPP Specification, with the addition of any or all of the signaled information described in this disclosure.

Each of segments 128, 132 may be associated with a unique uniform resource locator (URL). Thus, each of segments 128, 132 may be independently retrievable using a streaming network protocol, such as DASH. In this manner, a destination device, such as client device 40, may use an HTTP GET request to retrieve segments 128 or 132. In some examples, client device 40 may use HTTP partial GET requests to retrieve specific byte ranges of segments 128 or 132.

In accordance with the techniques of this disclosure, MPD 122 may include data, such as an xlink parameter, defining a network location of service description parameter data, as discussed in greater detail below. Alternatively, MPD 122 may include the service description itself.

Figure 4:
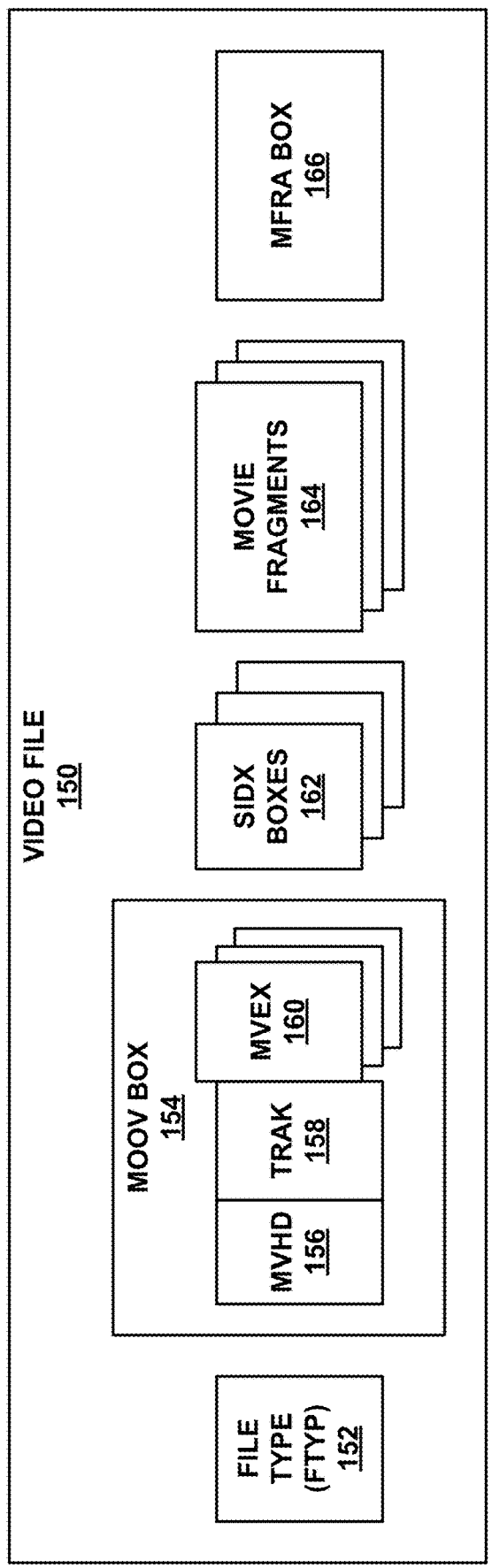
FIG. 4 is a block diagram illustrating elements of an example video file, which may correspond to a segment of a representation.

FIG. 4 is a block diagram illustrating elements of an example video file 150, which may correspond to a segment of a representation, such as one of segments 128, 132 of FIG. 3. Each of segments 128, 132 may include data that conforms substantially to the arrangement of data illustrated in the example of FIG. 4. Video file 150 may be said to encapsulate a segment. As described above, video files in accordance with the ISO base media file format and extensions thereof store data in a series of objects, referred to as "boxes." In the example of FIG. 4, video file 150 includes file type (FTYP) box 152, movie (MOOV) box 154, segment index (sidx) boxes 162, movie fragment (MOOF) boxes 164, and movie fragment random access (MFRA) box 166. Although FIG. 4 represents an example of a video file, it should be understood that other media files may include other types of media data (e.g., audio data, timed text data, or the like) that is structured similarly to the data of video file 150, in accordance with the ISO base media file format and its extensions.

File type (FTYP) box 152 generally describes a file type for video file 150. File type box 152 may include data that identifies a specification that describes a best use for video file 150. File type box 152 may alternatively be placed before MOOV box 154, movie fragment boxes 164, and/or MFRA box 166.

In some examples, a Segment, such as video file 150, may include an MPD update box (not shown) before FTYP box 152. The MPD update box may include information indicating that an MPD corresponding to a representation including video file 150 is to be updated, along with information for updating the MPD. For example, the MPD update box may provide a URI or URL for a resource to be used to update the MPD. As another example, the MPD update box may include data for updating the MPD. In some examples, the MPD update box may immediately follow a segment type (STYP) box (not shown) of video file 150, where the STYP box may define a segment type for video file 150.

MOOV box 154, in the example of FIG. 4, includes movie header (MVHD) box 156, track (TRAK) box 158, and one or more movie extends (MVEX) boxes 160. In general, MVHD box 156 may describe general characteristics of video file 150. For example, MVHD box 156 may include data that describes when video file 150 was originally created, when video file 150 was last modified, a timescale for video file 150, a duration of playback for video file 150, or other data that generally describes video file 150.

TRAK box 158 may include data for a track of video file 150. TRAK box 158 may include a track header (TKHD) box that describes characteristics of the track corresponding to TRAK box 158. In some examples, TRAK box 158 may include coded video pictures, while in other examples, the coded video pictures of the track may be included in movie fragments 164, which may be referenced by data of TRAK box 158 and/or sidx boxes 162.

In some examples, video file 150 may include more than one track. Accordingly, MOOV box 154 may include a number of TRAK boxes equal to the number of tracks in video file 150. TRAK box 158 may describe characteristics of a corresponding track of video file 150. For example, TRAK box 158 may describe temporal and/or spatial information for the corresponding track. A TRAK box similar to TRAK box 158 of MOOV box 154 may describe characteristics of a parameter set track, when encapsulation unit 30 (FIG. 3) includes a parameter set track in a video file, such as video file 150. Encapsulation unit 30 may signal the presence of sequence level SEI messages in the parameter set track within the TRAK box describing the parameter set track.

MVEX boxes 160 may describe characteristics of corresponding movie fragments 164, e.g., to signal that video file 150 includes movie fragments 164, in addition to video data included within MOOV box 154, if any. In the context of streaming video data, coded video pictures may be included in movie fragments 164 rather than in MOOV box 154. Accordingly, all coded video samples may be included in movie fragments 164, rather than in MOOV box 154.

MOOV box 154 may include a number of MVEX boxes 160 equal to the number of movie fragments 164 in video file 150. Each of MVEX boxes 160 may describe characteristics of a corresponding one of movie fragments 164. For example, each MVEX box may include a movie extends header box (MEHD) box that describes a temporal duration for the corresponding one of movie fragments 164.

As noted above, encapsulation unit 30 may store a sequence data set in a video sample that does not include actual coded video data. A video sample may generally correspond to an access unit, which is a representation of a coded picture at a specific time instance. In the context of AVC, the coded picture includes one or more VCL NAL units, which contain the information to construct all the pixels of the access unit and other associated non-VCL NAL units, such as SEI messages. Accordingly, encapsulation unit 30 may include a sequence data set, which may include sequence level SEI messages, in one of movie fragments 164. Encapsulation unit 30 may further signal the presence of a sequence data set and/or sequence level SEI messages as being present in one of movie fragments 164 within the one of MVEX boxes 160 corresponding to the one of movie fragments 164.

SIDX boxes 162 are optional elements of video file 150. That is, video files conforming to the 3GPP file format, or other such file formats, do not necessarily include SIDX boxes 162. In accordance with the example of the 3GPP file format, a SIDX box may be used to identify a sub-segment of a segment (e.g., a segment contained within video file 150). The 3GPP file format defines a sub-segment as "a self-contained set of one or more consecutive movie fragment boxes with corresponding Media Data box(es) and a Media Data Box containing data referenced by a Movie Fragment Box must follow that Movie Fragment box and precede the next Movie Fragment box containing information about the same track." The 3GPP file format also indicates that a SIDX box "contains a sequence of references to subsegments of the (sub)segment documented by the box. The referenced subsegments are contiguous in presentation time. Similarly, the bytes referred to by a Segment Index box are always contiguous within the segment. The referenced size gives the count of the number of bytes in the material referenced."

SIDX boxes 162 generally provide information representative of one or more sub-segments of a segment included in video file 150. For instance, such information may include playback times at which sub-segments begin and/or end, byte offsets for the sub-segments, whether the sub-segments include (e.g., start with) a stream access point (SAP), a type for the SAP (e.g., whether the SAP is an instantaneous decoder refresh (IDR) picture, a clean random access (CRA) picture, a broken link access (BLA) picture, or the like), a position of the SAP (in terms of playback time and/or byte offset) in the sub-segment, and the like.

Movie fragments 164 may include one or more coded video pictures. In some examples, movie fragments 164 may include one or more groups of pictures (GOPs), each of which may include a number of coded video pictures, e.g., frames or pictures. In addition, as described above, movie fragments 164 may include sequence data sets in some examples. Each of movie fragments 164 may include a movie fragment header box (MFHD, not shown in FIG. 4). The MFHD box may describe characteristics of the corresponding movie fragment, such as a sequence number for the movie fragment. Movie fragments 164 may be included in order of sequence number in video file 150.

MFRA box 166 may describe random access points within movie fragments 164 of video file 150. This may assist with performing trick modes, such as performing seeks to particular temporal locations (i.e., playback times) within a segment encapsulated by video file 150. MFRA box 166 is generally optional and need not be included in video files, in some examples. Likewise, a client device, such as client device 40, does not necessarily need to reference MFRA box 166 to correctly decode and display video data of video file 150. MFRA box 166 may include a number of track fragment random access (TFRA) boxes (not shown) equal to the number of tracks of video file 150, or in some examples, equal to the number of media tracks (e.g., non-hint tracks) of video file 150.

In some examples, movie fragments 164 may include one or more stream access points (SAPs), such as IDR pictures. Likewise, MFRA box 166 may provide indications of locations within video file 150 of the SAPs. Accordingly, a temporal sub-sequence of video file 150 may be formed from SAPs of video file 150. The temporal sub-sequence may also include other pictures, such as P-frames and/or B-frames that depend from SAPs. Frames and/or slices of the temporal sub-sequence may be arranged within the segments such that frames/slices of the temporal sub-sequence that depend on other frames/slices of the sub-sequence can be properly decoded. For example, in the hierarchical arrangement of data, data used for prediction for other data may also be included in the temporal sub-sequence.

Figure 5:
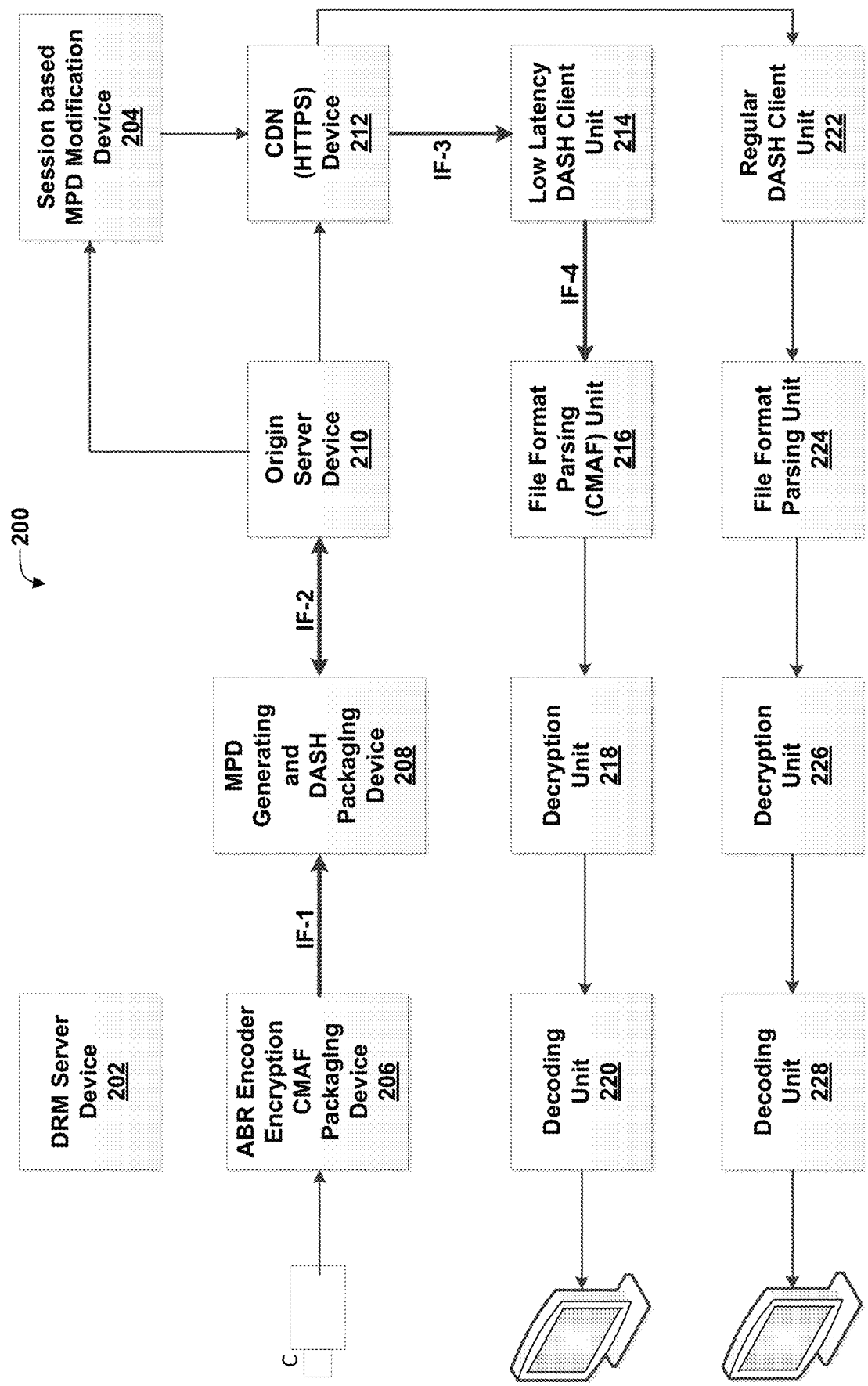
FIG. 5 is a conceptual diagram illustrating an example architecture including devices that may perform the techniques of this disclosure.

FIG. 5 is a conceptual diagram illustrating an example architecture 200 including various devices and units that may perform the techniques of this disclosure. In particular, architecture 200 includes server-side devices and units including adaptive bit rate (ABR) encoder, encryption, and CMAF packaging device 206, MPD generating and DASH packaging device 208, origin server device 210, session-based MPD modification device 204, and CDN (HTTPS) device 212. Architecture 200 also includes two example sets of client-side devices and units. As one example, a first client device includes low latency DASH client unit 214, file format parsing (CMAF) unit 216, decryption unit 218, and decoding unit 220. As another example, a second client device includes regular DASH client unit 222, file format parsing unit 224, decryption unit 226, and decoding unit 228.

The devices and units of FIG. 5 may correspond to devices and units of FIG. 1. For example, ABR encoder, encryption, and CMAF packaging device 206, and MPD generating and DASH packaging device 208 of FIG. 5 (and in some cases, origin server device 210) may collectively correspond to content preparation device 20 of FIG. 1. CDN (HTTPS) device 212 of FIG. 5 may correspond to server device 60 of FIG. 1. The various DASH clients 214, 222, file format parsing units 216, 224, decryption units 218, 226, and decoding units 220, 228 of FIG. 5 may correspond to respective components of client device 40 of FIG. 1, such as retrieval unit 52, decapsulation unit 50, audio decoder 46, and video decoder 48.

In the example of FIG. 5, ABR encoder, encryption, and CMAF packaging device 206 may, for example, produce common media application format (CMAF)/DASH segments. MPD generating and DASH packaging device 208 generates the MPD and publishes the data as DASH segments on origin server device 210. The DASH client units 214, 222, based on the information in the MPD, may initiate their streaming logic and the playout. Regular DASH client unit 222 may playout the media presentation with, for example, a 10 second latency, based on its buffer logic. Low latency DASH client unit 214, however, may identify that it is able to reduce the end-to-end latency and therefore provide a better streaming experience. Regular DASH clients may also be used for catch-up services.

Figure 6:
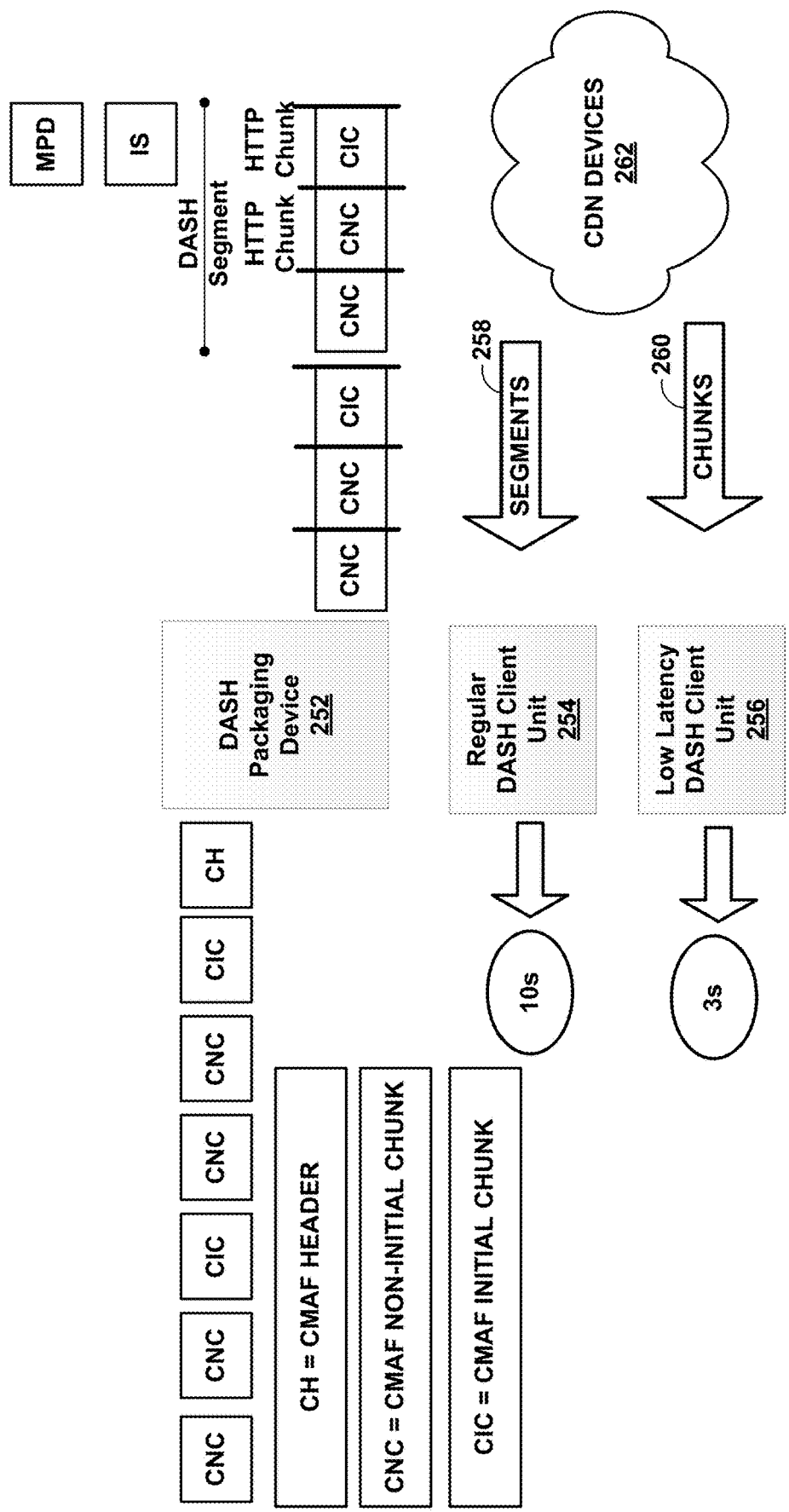
FIG. 6 is a conceptual diagram illustrating example operations of a DASH packager in an example low-latency mode according to the techniques of this disclosure.

FIG. 6 is a conceptual diagram illustrating example operations of DASH packaging device 252 in an example low-latency mode according to the techniques of this disclosure. In this example, DASH packaging device 252 packages CMAF headers (CH), CMAF non-initial chunks (CNC), and CMAF initial chunks (CIC) into DASH segments, including respective HTTP chunks. That is, ISO BMFF movie fragments, or CMAF chunks, are produced and then mapped by DASH packaging device 252 to HTTP chunks. DASH clients, such as regular DASH client unit 254 and low latency DASH client unit 256, request full segments, but DASH packaging device 252 may start delivering segments earlier than their complete availability. In particular, DASH packaging device 252 may provide segments to CDN devices 262, which may store the segments and provide the DASH segments to DASH clients 254, 256 in response to HTTP requests for the segments from DASH clients 254, 256.

A summary of technologies for DASH low-latency beyond the regular operation includes:
  Multiple Movie Fragments per Segment to enable producing the earlier part of the segment and offering it on the CDN.
    The chunk duration is a deployment option, but examples include: 1 frame, 320 ms, "Mini-GOPs."
  Signaling early availability in MPD
    Supported in the DASH MPD using the @availabilityTimeOffset and @availablityComplete attributes that signal early availability of the Segment compared to the nominal availability time.
  Using @duration and $Number$ for signaling URLs and availability times
    This disclosure recognizes an issue with the Segment Timeline which requires the duration of the Segment to be known to be announced.
  Signaling of capture time of the frame and prtf
    This is discussed in Amd.5 of DASH.
  HTTP Chunked Transfer Encoding of partially available files
  Support for Emsg parsing
    May be used for MPD updates.
    May be available for signaling sparse metadata.
  DRM and Encryption for Live and low-latency
    May be used to ensure that license acquisition can be done in the latency constraints and does not overload in network infrastructure.
  Consider signaling of missing or non-appropriate content
    This is discussed in Amd.5 of DASH.
  Accelerated playback in the device to address both low latency and fast startup
    This may be used to ensure that latency can be maintained without sacrificing channel access.
  HTTP variants, for example to support queued requests.
  Explicit signaling for low latency mode (format signalling and/or the protocol).

In DASH deployments, the DASH client has significant control over the algorithms and user perception for a DASH service. The DASH client may, for example, determine the use rate adaptation algorithm, the buffer strategy, the buffer duration and the resulting latency and channel change times. However, by leaving all decisions to the DASH client, this may result in inconsistent behavior as different client implementations may, for example, chose different strategies. Therefore, as an example, one may observe significantly different latencies for the same service on different DASH clients.

Figure 7:
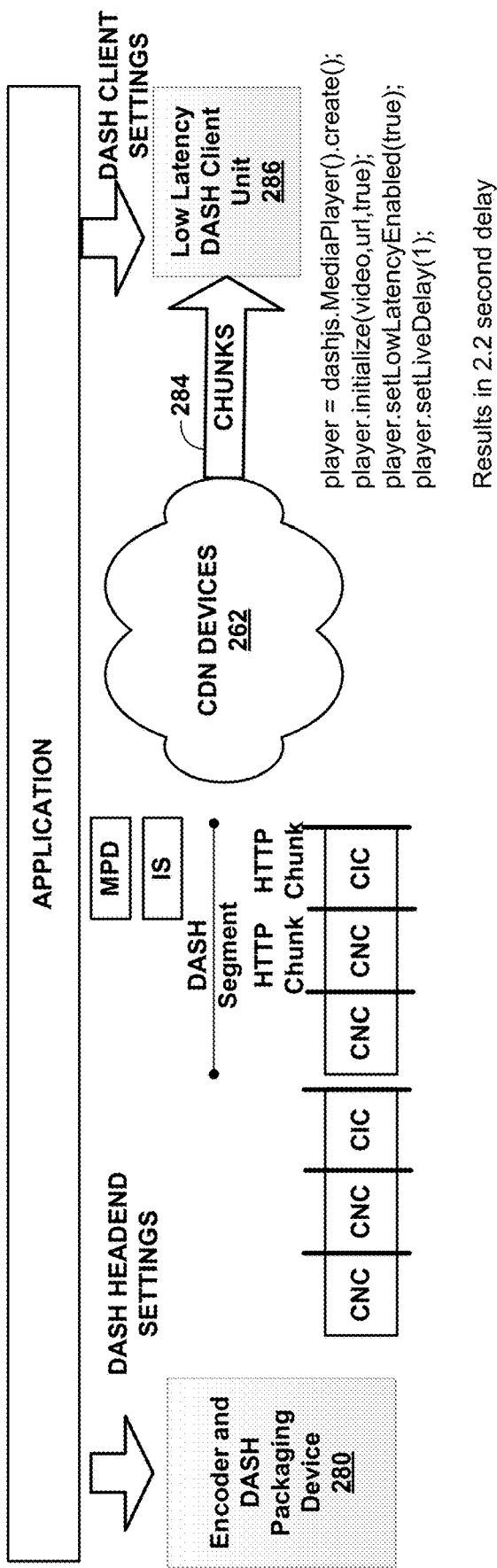
FIG. 7 is a conceptual diagram illustrating an example DASH client configuration according to the techniques of this disclosure.

FIG. 7 is a conceptual diagram illustrating an example DASH client configuration according to the techniques of this disclosure. FIG. 7 depicts encoder and DASH packaging device 280 (which may correspond to content preparation device 20 of FIG. 1), CDN devices 282 (which may correspond to server device 60 of FIG. 1) and low latency DASH client unit 286 (which may correspond to retrieval unit 52 of client device 40 of FIG. 1). In this example, encoder and DASH packaging device 280 prepares CNCs and CICs of segments including HTTP chunks and provides the segments to CDN devices 282. CDN devices 282 provide the segments (or HTTP chunks thereof) to low latency DASH client unit 286 in response to HTTP requests for the segments or HTTP chunks.

In the case for which an application controls playback of a media presentation service, the application may also control low latency DASH client unit 286. As an example, FIG. 7 shows the integration of low latency DASH client unit 286 (e.g., a dash.js client) into a service environment. Dash.js in the current implementation 2.9.0 support a set of APIs that the application can use to set the client to low-latency mode and determine the delay. In the example of FIG. 7, the delay is set to 1, indicating the goal of 1 second. In tests run, such a setting resulted in a delay of 2.2 seconds.

This scenario may lead to deployments for which a service is offered to different DASH client implementations:
  The application-based solution is not always reliable, as some environments work for example without applications, or the application is not able to access the DASH client. Also, DASH client APIs may be different, and there is no common solution and settings of the parameters are not possible.

The DASH client needs to make complex decisions based on information from the service offering, the device capabilities, user interaction and network status. Such information may not always be expressed consistently.

The service provider wants to express the desired service perception supporting/forcing the DASH client to appropriate execute the rate adaption.

Hence there is a benefit to defining service parameters more consistently and to enable delivery of these service parameters as part of the manifest file (e.g., an MPD). The usage of the client of the service parameters may be up to the client implementation, but it may also be the case that in certain application standards, stronger requirements are formulated on the client to fulfill such service parameters. According to the techniques of this disclosure, encoder and DASH packaging device 280 may prepare a service description including playback preferences, such as a desired end-to-end latency between CDN devices 282 and low latency DASH client unit 286 (or between encoder and DASH packaging device 280 and low latency DASH client unit 286).

The following use cases may be considered as service configurations, which may be expressed in playback preferences of a service description:

1. The service has a desired end-to-end latency whereby the content contains some anchors that maps the media time to wall-clock time (or any other time reference the DASH client has access to) and the DASH client therefore playback the service at this latency.
2. The service may have a gradual degradation over latency, starting from a minimum value. For example, at 3.5 second latency the quality may be considered high, at 10 seconds latency the quality may be considered medium, and at 30 seconds latency the quality in the live consumption may be considered low.
3. In a live case, the service may request that in case of rebuffering, the service returns to the live delay as quickly as possible, not delaying service. In another case the service may preferably be to not jump back to the live edge.
4. Yet another service may attempt to synchronize to another device, and this service is only valuable if it maintains a specific latency. Should the latency be greater than the one requested, then service quality may be useless.
5. The service offering may provide a desired access time, or it may provide quality degradation over the service access time.
6. The service is a UHD service and the service quality is judged based on what Representation and Adaptation Set is chosen, potentially over time.
7. The service has a multitude of offerings, for example it is offered in standard definition (SD), high definition (HD), and ultra high definition (UHD). Depending on the device capabilities, for example the device display resolution, the client is expected to pick a matching Adaptation Set.
8. Similar aspects may be considered for audio. Based on speaker layout, a dedicated Adaptation Set should be selected.
9. The service quality may be described based on the maximum rebuffering percentage that a client should obey, or it may provide a quality degradation over the rebuffering ratio.
10. The service may allow accelerated or decelerated playback of the media to compensate buffer problems. A maximum and a minimum of permitted acceleration/deceleration may be specified.

Accordingly, encoder and DASH packaging device 280 may prepare a service description including playback preferences representing any or all of the configuration data discussed above, such as a desired end-to-end latency. Low latency DASH client unit 286 may use the service description and playback preferences thereof to control playback, e.g., to achieve the desired end-to-end latency. For example, low latency DASH client unit 286 may retrieve segments or HTTP chunks and store the segments or chunks to a buffer in a memory, such as cache 104 shown in FIG. 2. Low latency DASH client unit 286 may also determine whether the buffer is being emptied faster or slower than the buffer is being filled. If the buffer is being emptied faster than the buffer is being filled, low latency DASH client unit 286 may decrease a playback rate of the media data to avoid buffer underfloor. If the buffer is being emptied slower than the buffer is being filled, low latency DASH client unit 286 may increase the playback rate of the media data to avoid buffer overflow. Low latency DASH client unit 286 may use data signaled in the service description specifying the maximum and minimum acceleration/deceleration of media playback to ensure such playback rate adjustments are within the specified maximum and minimum.

As another example, the desired end-to-end latency may be one of a variety of specified target latencies. Encoder and DASH packaging device 280 may specify various qualities associated with each of the possible target latencies. In this manner, low latency DASH client unit 286 may select one of the target latencies associated with a desired playback quality and retrieve and playback media data associated with the selected target latency.

Low latency DASH client unit 286 may further determine, in response to a rebuffering event (that is, interruption in playback), whether to continue playback from where playback was interrupted or to jump ahead to the live edge. The live edge represents a most recently available portion of the media data that can be retrieved and presented. Encoder and DASH packing device 280 may specify which of these behaviors is recommended in the service description.

In some examples, encoder and DASH packaging device 280 may specify whether one or more client devices should synchronize playback (e.g., if multiple displays are showing the same live content, such as a sporting event or newsworthy event that is occurring live). Such synchronization may only be possible if all of the synchronized devices use the same latency. Encoder and DASH packaging device 280 may specify such latencies for synchronization. Thus, low latency DASH client unit 286 may determine whether to synchronize playback with one or more other client devices, and if so, to use one of the specified latencies for synchronization as the desired end-to-end latency.

Other aspects could be considered and some extensibility or proprietary signaling may be considered.

Degradations in quality may be expressed in for example mean opinion score (MOS) score, or it may be expressed as abstract point scales, for example from 0 (unusable quality) to 100 (perfect quality).

In accordance with the techniques of this disclosure, low latency DASH client unit 286 may use one or multiple of these parameters for the static selection of content, as well as for the dynamic operation of playback to create a utility function that takes into account the different dimensions of the service offering.

A DASH client, such as retrieval unit 52 of FIG. 1, DASH client 110 of FIG. 2, or the various DASH clients of FIGS. 5-7, and source devices, such as content preparation device 20 and server device 60, or the various servers and source devices of FIGS. 5-7, may be configured to use the techniques of this disclosure. In general, the techniques of this disclosure:

Define a set of well-defined service description parameters that reflect actual use cases and that may be used by the DASH client to follow these techniques.

Define a mapping of the service description to an MPD signaling in DASH. The service description may be provided as a URL, for example as an xlink. This avoids MPD updates being needed to refetch the data repeatedly. The information should be static over the live time of a Media Presentation.

Define an extension mechanism such that service signaling can be added based on server and client agreements.

Define a simple DASH reference client description to show how such information may be used in a DASH operation.

Figure 8:
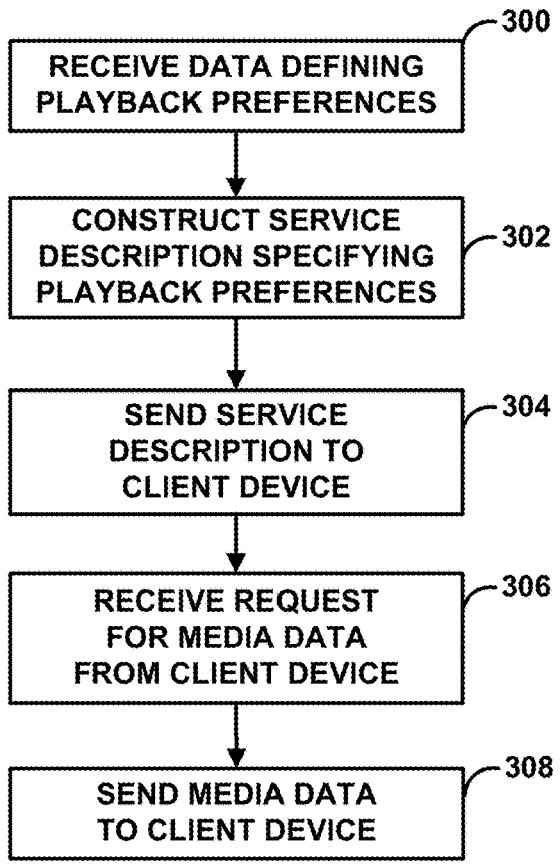
FIG. 8 is a flowchart illustrating an example method of sending media data to a client device according to techniques of this disclosure.

Any or all of the following parameters may be included in service description parameters according to the techniques of this disclosure:

Service Type: Provide a description of the service type
  Live: the client is expected to follow the live edge only.
  Live & Catchup: The service is expected to follow the live edge, but may also be consumed as catch-up.
  Catch-up: The service is converted from a live service, but all media is available
  On-Demand: the service is an on-demand service.
  Unknown: The service type is unknown.
  Cardinality: 0 . . . 1
Join Behavior Type
  Live edge: the client is expected to join at the live edge.
  At first Period: the client is expected to join at the first period.
  Unknown: The client chooses based on itself or based on other information.
  Cardinality: 0 . . . 1
Live Latency Properties:
  Minimum latency
  Maximum latency
  Desired latency
  A set of pairs (latency and quality)
  Cardinality: 0 . . . 1
Rebuffering Properties
  Maximum rebuffering percentage
  Desired rebuffering percentage
  As set of pairs (rebuffering percentage and latency)
  Cardinality: 0 . . . 1
Random Access Time
  Desired random access time
  Maximum random access time
  A set of pairs (random access time and quality)
  Cardinality: 0 . . . 1
Service Quality for device type (This may be updated for every period)
  Device property
  Display resolution
  Other device type elements
  Pair of (selected Representation id, and quality)
  Cardinality: 0 . . . N
Accelerated Playback
  Maximum
  Minimum
  Maximum percentage
  Cardinality: 0 . . . 1
Service Parameter
  schemeIdURI and value
  Follows the DASH descriptor logic FIG. 8 is a flowchart illustrating an example method of sending media data to a client device according to techniques of this disclosure. The method of FIG. 8 is explained with respect to content preparation device 20 of FIG. 1. However, it should be understood that other devices, such as server device 60 of FIG. 1, may be configured to perform these or other similar techniques, alone or in conjunction with content preparation device 20. For example, MPD generating and DASH packaging device 208, origin service device 210, and CDN (HTTPS) device 212 of FIG. 5 may jointly perform corresponding portions of the method of FIG. 8. As another example, DASH packaging device 252 and CDN devices 262 of FIG. 6 may jointly perform corresponding portions of the method of FIG. 8. As another example, encoder and DASH packaging device 280 and CDN devices 282 may jointly perform corresponding portions of the method of FIG. 8.

In this example, content preparation device 20 initially receives data defining playback preferences for a media presentation (300), e.g., from an administrator or other user. Such playback preferences may include one or more latencies for the media presentation, as well as other properties to achieve those latencies. Content preparation device 20 may then prepare a service description specifying the playback preferences (302). For example, as noted above, content preparation device 20 may construct the service description to specify a service type, such as live, live and catch-up, catch-up, or on-demand. As another example, content preparation device 20 may construct the service description to specify join behavior, such as to join at the live edge or at a first available period. As another example, content preparation device 20 may construct the service description to specify latency properties, such as a minimum latency and/or maximum latency, one or more target latencies, and in some cases, corresponding qualities for the specified target latencies.

As another example, content preparation device 20 may construct the service description to specify rebuffering properties, such as a maximum rebuffering percentage and desired rebuffering percentage, and in some examples, corresponding latencies for the rebuffering percentages. As another example, content preparation device 20 may construct the service description to specify random access times, such as a desired random access time and/or maximum random access time, and in some examples, associated qualities. As another example, content preparation device 20 may construct the service description to specify service qualities based on a device type, such as characteristics of the device (e.g., display resolution), and corresponding expected qualities for devices of each type.

In some examples, content preparation device 20 may construct the service description to specify accelerated or decelerated playback rate information, such as a maximum acceleration, minimum acceleration (i.e., maximum deceleration), and/or playback rate adjustment percentage. Such playback rate adjustments may be set to prevent client device buffer overflow and underflow, without overly impacting perceptible quality of media playback. Content preparation device 20 may construct the service description to specify the various parameters as a schemeIdURI and value according to DASH descriptor logic.

Content preparation device 20 may then send the service description to a client device, such as client device 40 (FIG.

1) (304). Content preparation device 20 may send the service description via server device 60. In some examples, content preparation device 20 may send the service description to a different network location, and specify a URL or other identifier for the network location of the service description in a manifest file, such as an MPD. Content preparation device 20 may then receive a request for media data from the client device (306) and send the requested media data to the client device (308) to achieve the desired end-to-end latency according to the service parameters specified in the service description.

In this manner, the method of FIG. 8 represents an example of a method of sending media including sending a service description including data including one or more playback preferences for a corresponding media presentation to a client device, the playback preferences including a desired end-to-end latency; receiving a request for media data of the media presentation from the client device; and sending the media data of the media presentation to the client device in response to the request for the media data from the client device according to the one or more playback preferences and to achieve the desired end-to-end latency.

Figure 9:
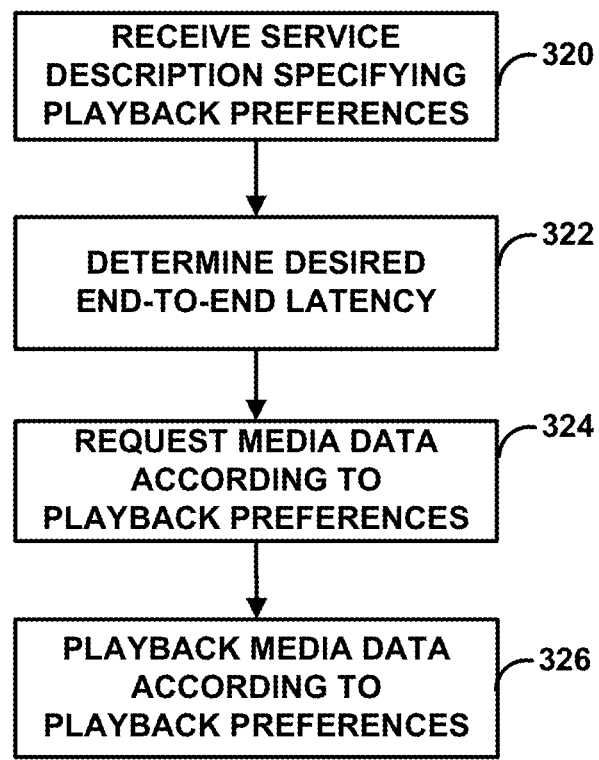
FIG. 9 is a flowchart illustrating an example method of retrieving media data according to the techniques of this disclosure.

FIG. 9 is a flowchart illustrating an example method of retrieving media data according to the techniques of this disclosure. The method of FIG. 9 is explained with respect to client device 40 of FIG. 1. However, it should be understood that other devices may be configured to perform this or a similar method. For example, low latency DASH client unit 214 of FIG. 5, regular DASH client unit 222 of FIG. 5, regular DASH client unit 254 of FIG. 6, low latency DASH client unit 256 of FIG. 6, or low latency DASH client unit 286 of FIG. 7 may be configured to perform this or a similar method according to the techniques of this disclosure.

In this example, retrieval unit 52 of client device 40 receives a service description specifying playback preferences for a media presentation (320). For example, retrieval unit 52 may initially retrieve a manifest file (e.g., an MPD), such as manifest file 66 of FIG. 1 or MPD 122 of FIG. 3. The manifest file may include the service description. Alternatively, the manifest file may specify a network location from which the service description can be retrieved, and client device 40 may retrieve the service description, e.g., by dereferencing an xlink parameter of the manifest file.

Retrieval unit 52 may then determine a desired end-to-end latency for the media presentation from the service description (322). For example, the service description may specify one or more target latencies, which may include a maximum and/or minimum latency. The service description may also (additionally or alternatively) specify corresponding quality levels for the various latencies. In some examples, the service description may specify various latencies associated with various types of client devices (e.g., a cellular phone, a computer terminal, a television, a projector, or the like). Additionally, the service description may specify techniques for performing playback to achieve and maintain the target latency, such as maximum and minimum playback acceleration (or deceleration) values. The service description may also specify other playback preferences as discussed above, such as join behavior, rebuffering behavior, and the like.

Accordingly, retrieval unit 52 may request media data according to the playback preferences (324) and playback the media data according to the playback preferences (326). For example, assuming the service description specified a desired end-to-end latency and playback acceleration/deceleration rates to achieve the desired end-to-end latency, retrieval unit 52 may retrieve media data and buffer the media data in memory (e.g., cache 104 of FIG. 2). During playback, retrieval unit 52 may accelerate or decelerate playback according to whether the buffer is being filled or emptied too quickly. As discussed above, if the buffer is being filled too quickly, retrieval unit 52 may accelerate the playback rate, whereas if the buffer is being emptied too quickly, retrieval unit 52 may decelerate the playback rate, within the signaled playback acceleration/deceleration rates of the service description.

As another example, if a rebuffering event occurs, retrieval unit 52 may determine whether to restart playback from where playback was interrupted or at the live edge of the media presentation, according to the service description. Similarly, retrieval unit 52 may determine whether to access an earliest available period or the live edge of the media presentation when initially accessing the media presentation.

In this manner, the method of FIG. 9 represents an example of a method of retrieving media data including retrieving a service description including data including one or more playback preferences for a corresponding media presentation, the playback preferences including a desired end-to-end latency; retrieving media data of the media presentation via a network streaming protocol; and presenting the retrieved media data according to the one or more playback preferences and to achieve the desired end-to-end latency.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code, and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of retrieving media data, the method comprising:
    retrieving, by a client device, a service description including data including one or more playback preferences for a media presentation, the one or more playback preferences including a desired end-to-end latency for the media presentation as specified by a service provider for the media presentation, the desired end-to-end latency comprising a specified target latency for transmission of the media presentation via a hypertext transfer protocol (HTTP)-based network streaming protocol between a source device and the client device, wherein the service description specifies a maximum accelerated playback rate and a minimum decelerated playback rate to achieve the desired end-to-end latency;
    retrieving, by the client device, the media data of the media presentation via the HTTP-based network streaming protocol from the source device; and
    presenting, by the client device, the retrieved media data according to the one or more playback preferences and to achieve the desired end-to-end latency, wherein presenting the retrieved media data comprises increasing or decreasing a playback rate of the retrieved media data to achieve the desired end-to-end latency.

2. The method of claim 1, wherein retrieving the service description comprises:
    retrieving a manifest file for the media presentation;
    determining a network location of the service description from the manifest file; and
    retrieving the service description from the network location.

3. The method of claim 2, wherein the manifest file comprises a media presentation description (MPD).

4. The method of claim 2, wherein determining the network location comprises determining the network location from an xlink parameter of the manifest file, the xlink parameter representing the network location of the service description.

5. The method of claim 1, wherein the one or more playback preferences include data representing at least one of a maximum latency or a minimum latency for presentation of the media presentation.

6. The method of claim 5, wherein the one or more playback preferences map the media data to wall-clock times at which the media data is to be presented to achieve at least one of the desired end-to-end latency, the maximum latency, or the minimum latency.

7. The method of claim 1, wherein the one or more playback preferences include data representing relative quality levels for corresponding latencies.

8. The method of claim 1, wherein presenting the retrieved media data comprises discarding retrieved media data without presenting the discarded retrieved media data to achieve the desired end-to-end latency.

9. The method of claim 1, wherein presenting the retrieved media data comprises synchronizing presentation of the media data with presentation of the media data by another device.

10. The method of claim 1, wherein presenting the retrieved media data comprises accelerating or decelerating the playback rate within the maximum accelerated playback rate and the minimum decelerated playback rate to achieve the desired end-to-end latency.

11. A client device for retrieving media data, the client device comprising:
    a memory configured to store the media data of a media presentation; and
    one or more processors implemented in circuitry and configured to:
        retrieve a service description including data including one or more playback preferences for the media presentation, the one or more playback preferences including a desired end-to-end latency for the media presentation as specified by a service provider for the media presentation, the desired end-to-end latency comprising a specified target latency for transmission of the media presentation via a hypertext transfer protocol (HTTP)-based network streaming protocol between a source device and the client device, wherein the service description specifies a maximum accelerated playback rate and a minimum decelerated playback rate to achieve the desired end-to-end latency;
        retrieve the media data of the media presentation via the HTTP-based network streaming protocol from the source device; and
        present the retrieved media data according to the one or more playback preferences and to achieve the desired end-to-end latency, wherein the one or more processors are configured to increase or decrease a playback rate of the retrieved media data to achieve the desired end-to-end latency.

12. The client device of claim 11, wherein to retrieve the service description, the one or more processors are configured to:
    retrieve a manifest file for the media presentation;
    determine a network location of the service description from the manifest file; and
    retrieve the service description from the network location.

13. The client device of claim 12, wherein the manifest file comprises a media presentation description (MPD).

14. The client device of claim 12, wherein the one or more processors are configured to determine the network location from an xlink parameter of the manifest file, the xlink parameter representing the network location of the service description.

15. The client device of claim 11, wherein the one or more playback preferences include data representing at least one of a maximum latency or a minimum latency for presentation of the media presentation.

16. The client device of claim 15, wherein the one or more playback preferences map the media data to wall-clock times at which the media data is to be presented to achieve at least one of the desired end-to-end latency, the maximum latency, or the minimum latency.

17. The client device of claim 11, wherein the one or more playback preferences include data representing relative quality levels for corresponding latencies.

18. The client device of claim 11, wherein the one or more processors are configured to discard retrieved media data without presenting the discarded retrieved media data to achieve the desired end-to-end latency.

19. The client device of claim 11, wherein the one or more processors are configured to synchronize presentation of the media data with presentation of the media data by another device.

20. The client device of claim 11, wherein the one or more processors are configured to accelerate or decelerate a playback rate within the maximum accelerated playback rate and the minimum decelerated playback rate to achieve the desired end-to-end latency.

21. A computer-readable storage medium having stored thereon instructions that, when executed, cause a processor of a client device to:
retrieve a service description including data including one or more playback preferences for a media presentation, the one or more playback preferences including a desired end-to-end latency for the media presentation as specified by a service provider for the media presentation, the desired end-to-end latency comprising a specified target latency for transmission of the media presentation via a hypertext transfer protocol (HTTP)-based network streaming protocol between a source device and the client device, wherein the service description specifies a maximum accelerated playback rate and a minimum decelerated playback rate to achieve the desired end-to-end latency;
retrieve media data of the media presentation via the HTTP-based network streaming protocol from the source device; and
present the retrieved media data according to the one or more playback preferences and to achieve the desired end-to-end latency, wherein the instructions that cause the processor to present the retrieved media data comprise instructions that cause the processor to increase or decrease a playback rate of the retrieved media data to achieve the desired end-to-end latency.

22. The computer-readable storage medium of claim 21, wherein the instructions that cause the processor to present the retrieved media data comprise instructions that cause the processor to accelerate or decelerate a playback rate within the maximum accelerated playback rate and the minimum decelerated playback rate to achieve the desired end-to-end latency.

23. A client device for retrieving media data, the client device comprising:
means for retrieving a service description including data including one or more playback preferences for a media presentation, the one or more playback preferences including a desired end-to-end latency for the media presentation as specified by a service provider for the media presentation, the desired end-to-end latency comprising a specified target latency for transmission of the media presentation via a hypertext transfer protocol (HTTP)-based network streaming protocol between a source device and the client device, wherein the service description specifies a maximum accelerated playback rate and a minimum decelerated playback rate to achieve the desired end-to-end latency;
means for retrieving the media data of the media presentation via the HTTP-based network streaming protocol from the source device; and
means for presenting the retrieved media data according to the one or more playback preferences and to achieve the desired end-to-end latency, wherein the means for presenting the retrieved media data comprises means for increasing or decreasing a playback rate of the retrieved media data to achieve the desired end-to-end latency.

24. The client device of claim 23, wherein the means for presenting the retrieved media data comprises means for accelerating or decelerating a playback rate within the maximum accelerated playback rate and the minimum decelerated playback rate to achieve the desired end-to-end latency.

25. A method of sending media data, the method comprising:
sending, by a source device, a service description including data including one or more playback preferences for a media presentation to a client device, the one or more playback preferences including a desired end-to-end latency specified by a service provider for the media presentation, the desired end-to-end latency comprising a specified target latency for transmission of the media presentation via a hypertext transfer protocol (HTTP)-based network streaming protocol between the source device and the client device, wherein the service description specifies a maximum accelerated playback rate and a minimum decelerated playback rate to achieve the desired end-to-end latency;
receiving, by the source device, a request for the media data of the media presentation from the client device via the HTTP-based network streaming protocol; and
sending, by the source device, the media data of the media presentation to the client device in response to the request for the media data from the client device according to the one or more playback preferences and to achieve the desired end-to-end latency via the HTTP-based network streaming protocol.

26. The method of claim 25, wherein the one or more playback preferences include data representing at least one of a maximum latency or a minimum latency for presentation of the media presentation.

27. The method of claim 26, wherein the one or more playback preferences map the media data to wall-clock times at which the media data is to be presented to achieve at least one of the desired end-to-end latency, the maximum latency, or the minimum latency.

28. The method of claim 25, wherein the one or more playback preferences include data representing relative quality levels for corresponding latencies.

29. A source device for sending media data, the device comprising:

a memory configured to store the media data of a media presentation and a service description including one or more playback preferences for the media presentation, the one or more playback preferences including a desired end-to-end latency specified by a service provider for the media presentation, the desired end-to-end latency comprising a specified target latency for transmission of the media presentation via a hypertext transfer protocol (HTTP)-based network streaming protocol between the source device and a client device, wherein the service description specifies a maximum accelerated playback rate and a minimum decelerated playback rate to achieve the desired end-to-end latency; and one or more processors implemented in circuitry and configured to:
  send the service description to the client device;
  receive a request for the media data of the media presentation from the client device via the HTTP-based network streaming protocol; and
  send the media data of the media presentation to the client device in response to the request for the media data from the client device according to the one or more playback preferences and to achieve the desired end-to-end latency via the HTTP-based network streaming protocol.

30. The source device of claim 29, wherein the one or more playback preferences include data representing at least one of a maximum latency or a minimum latency for presentation of the media presentation.

31. The source device of claim 30, wherein the one or more playback preferences map the media data to wall-clock times at which the media data is to be presented to achieve at least one of the desired end-to-end latency, the maximum latency, or the minimum latency.

32. The source device of claim 29, wherein the one or more playback preferences include data representing relative quality levels for corresponding latencies.

33. A computer-readable storage medium having stored thereon instructions that, when executed, cause a processor of a source device to:
  send a service description including data including one or more playback preferences for a media presentation to a client device, the one or more playback preferences including a desired end-to-end latency specified by a service provider for the media presentation, the desired end-to-end latency comprising a specified target latency for transmission of the media presentation via a hypertext transfer protocol (HTTP)-based network streaming protocol between the source device and the client device, wherein the service description specifies a maximum accelerated playback rate and a minimum decelerated playback rate to achieve the desired end-to-end latency;
  receive a request for media data of the media presentation from the client device via the HTTP-based network streaming protocol; and
  send the media data of the media presentation to the client device in response to the request for the media data from the client device according to the one or more playback preferences and to achieve the desired end-to-end latency via the HTTP-based network streaming protocol.

34. A source device for sending media data, the source device comprising:
  means for sending a service description including data including one or more playback preferences for a media presentation to a client device, the one or more playback preferences including a desired end-to-end latency specified by a service provider for the media presentation, the desired end-to-end latency comprising a specified target latency for transmission of the media presentation via a hypertext transfer protocol (HTTP)-based network streaming protocol between the source device and the client device, wherein the service description specifies a maximum accelerated playback rate and a minimum decelerated playback rate to achieve the desired end-to-end latency;
  means for receiving a request for the media data of the media presentation from the client device via the HTTP-based network streaming protocol; and
  means for sending the media data of the media presentation to the client device in response to the request for the media data from the client device according to the one or more playback preferences and to achieve the desired end-to-end latency via the HTTP-based network streaming protocol.

* * * * *